US008508965B2

(12) United States Patent
Hallak

(10) Patent No.: US 8,508,965 B2
(45) Date of Patent: Aug. 13, 2013

(54) INVERTER AND METHOD FOR OPERATING THE INVERTER

(75) Inventor: Jalal Hallak, Vienna (AT)

(73) Assignee: Siemens Aktiengesellschaft, Müchen (DE)

( * ) Notice: Subject to any disclaimer, the term of this patent is extended or adjusted under 35 U.S.C. 154(b) by 299 days.

(21) Appl. No.: 12/999,692

(22) PCT Filed: May 18, 2009

(86) PCT No.: PCT/EP2009/055977
§ 371 (c)(1),
(2), (4) Date: Dec. 17, 2010

(87) PCT Pub. No.: WO2009/156230
PCT Pub. Date: Dec. 30, 2009

(65) Prior Publication Data
US 2011/0096581 A1    Apr. 28, 2011

(30) Foreign Application Priority Data

Jun. 25, 2008   (AT) .................................. A1009/2008

(51) Int. Cl.
*H02M 7/5387*   (2007.01)
*H02H 7/122*    (2006.01)
(52) U.S. Cl.
USPC ....................................... 363/132; 363/56.02
(58) Field of Classification Search
USPC ................ 363/56, 98, 131–132, 56.01–56.04
See application file for complete search history.

(56) References Cited

U.S. PATENT DOCUMENTS

| 4,566,059 | A | * | 1/1986 | Gallios et al. ................... 363/17 |
| 4,937,725 | A | * | 6/1990 | Dhyanchand et al. ...... 363/56.05 |
| 5,072,141 | A | * | 12/1991 | Eisenbart et al. ............. 327/424 |
| 5,546,294 | A | * | 8/1996 | Schutten et al. ................ 363/17 |

(Continued)

FOREIGN PATENT DOCUMENTS

| DE | 4431665 A1 | 3/1995 |
| DE | 4446778 A1 | 6/1996 |

(Continued)

OTHER PUBLICATIONS

Kwang-Hwa Liu, Member IEEE, and Fred C.Y.Lee, Fellow, IEEE; Zero-Voltage Switching Technique in DC/DC Converters; IEEE Transactions on Power Electronics, IEEE Service Center, Piscataway, NJ, US, Bd.5, Nr. 3, Jul. 1, 1990, Seiten 293-304, XP000137426 ISSN: 0885-8993; Others.

*Primary Examiner* — Bao Q Vu
*Assistant Examiner* — Yusef Ahmed

(57) ABSTRACT

An inverter for converting a DC input voltage to an AC output voltage with an H-bridge is provided. A storage choke circuit is provided between the H-bridge and output-side AC voltage terminals. The storage choke circuit includes a freewheeling path with a freewheeling diode for commutating the current after a turn-off process of a semiconductor switch of the H-bridge. In this arrangement, each switching semiconductor switch is coupled to a resonant circuit which contains capacitive resonant elements and inductive resonant elements. The freewheeling path includes first and second freewheeling diodes connected in parallel, wherein the parallel circuit is connected in series with the inductive resonant elements and the second freewheeling diode is connected in series with capacitive freewheeling elements which are charged to a corresponding voltage at the start of a freewheeling phase as elements of the resonant circuit for zero voltage switching of the second freewheeling diode.

13 Claims, 24 Drawing Sheets

(56) References Cited

U.S. PATENT DOCUMENTS

| | | | |
|---|---|---|---|
| 5,563,777 A * | 10/1996 | Miki et al. | 363/37 |
| 5,774,346 A * | 6/1998 | Poon et al. | 363/17 |
| 2002/0172062 A1* | 11/2002 | Furukawa et al. | 363/132 |
| 2005/0030778 A1* | 2/2005 | Phadke et al. | 363/132 |
| 2007/0081368 A1* | 4/2007 | Wai et al. | 363/98 |
| 2008/0212348 A1* | 9/2008 | Hallak | 363/132 |

FOREIGN PATENT DOCUMENTS

| | | |
|---|---|---|
| JP | 8298781 A | 11/1996 |
| JP | 2001320884 A | 11/2001 |
| JP | 2006197711 A | 7/2006 |
| WO | WO 9423488 A1 * | 10/1994 |

* cited by examiner

INVERTER AND METHOD FOR OPERATING THE INVERTER

CROSS REFERENCE TO RELATED APPLICATIONS

This application is the US National Stage of International Application No. PCT/EP2009/055977 filed May 18, 2009, and claims the benefit thereof. The International Application claims the benefits of Austrian Application No. A1009/2008 AT filed Jun. 25, 2008. All of the applications are incorporated by reference herein in their entirety.

FIELD OF INVENTION

The invention relates to an inverter for converting a DC input voltage to an AC output voltage, comprising an H-bridge having four semiconductor switches, wherein at least one semiconductor switch is in switching mode, wherein a storage choke circuit is additionally disposed between the H-bridge and output-side AC voltage terminals, said choke circuit comprising a freewheeling path with a freewheeling diode for commutating the current after a turn-off process of a semiconductor switch of the H-bridge. The invention also relates to a method for operating the inverter.

BACKGROUND OF INVENTION

Many different inverter topologies are known from the prior art. A very common embodiment example is the so-called H-bridge in which four semiconductor switches, in particular IGBTs, are disposed in a bridge circuit configuration. The switching semiconductor switches are generally PWM-controlled to simulate a sinusoidal voltage waveform of a connected AC system, the switching frequency being a multiple of the system frequency.

Inverters are being increasingly used for feeding power from alternative energy sources, such as solar generators or fuel cells, into public utility grids or off-grid systems. To make this form of power generation cost-effective, all the components must have high levels of efficiency. This applies particularly to inverters for grid-synchronous conversion of the power generated.

JP 2001 320 884 A or JP 2006 197 711 A, for example, describe inverters comprising H-bridges, the semiconductor switches of which operate powerlessly, thereby minimizing total power dissipation. Known techniques here are zero voltage switching (ZVS) and zero current switching (ZCS).

Another source of power loss are the freewheeling phases after a semiconductor switch has turned off. These are caused by the output-side choke circuits whose current continues to flow when the semiconductor switch is OFF. Freewheeling paths within an inverter circuit are mainly formed via parasitic diodes of the semiconductor switches or via freewheeling diodes specially provided for the purpose. Since a voltage is generally dropped across these diodes at the start of a freewheeling phase, as the current through the diodes increases, power dissipation occurs which places an upper limit on the efficiency of the inverter.

SUMMARY OF INVENTION

An object of the invention is to develop the prior art inverters in order to achieve improved efficiency.

This object is achieved according to the invention by a method of the type mentioned in the introduction wherein, to provide zero voltage switching, each switching semiconductor switch is connected to a resonant circuit which contains capacitive resonant elements and inductive resonant elements, wherein the freewheeling path comprises a first and a second freewheeling diode connected in parallel, wherein said parallel circuit is connected in series with the inductive resonant elements and wherein the second freewheeling diode is connected in series with capacitive freewheeling elements which, as elements of the resonant circuit, are charged to a corresponding voltage at the start of a freewheeling phase for zero voltage switching of the second freewheeling diode. The energy stored in the resonant circuit during an OFF phase is used to charge the capacitive freewheeling elements in an ON phase of the switching semiconductor switch. The freewheeling elements are connected in series with the second freewheeling diode in order to de-energize it at the start of a freewheeling phase. The capacitive freewheeling elements are discharged in a first period of freewheeling, wherein the first freewheeling diode is de-energized and the freewheeling current commutates losslessly to the first freewheeling diode.

The circuit as claimed enables both lossless switching of the semiconductor switches of the H-bridge and virtually lossless freewheeling after turn-off of the switching semiconductor switch.

It is advantageous here if each resonant circuit comprises a resonant capacitor and a resonant choke, wherein a freewheeling capacitor is connected via coupling elements to a resonant capacitor and wherein a first leg of the freewheeling path comprises the first freewheeling diode and the resonant choke connected in series, and wherein a second leg of the freewheeling path comprises the second freewheeling diode, the resonant choke and the freewheeling capacitor connected in series. The coupling elements are constituted, for example, by diode circuits for defining a corresponding current direction during a resonant oscillation, or by transformers. After a turn-on process of the switching semiconductor switch, energy is therefore transferred from the resonant capacitor to the freewheeling capacitor via the coupling elements in order to ensure powerless freewheeling for the next turn-off process.

In one embodiment variant of the invention, the first semiconductor switch of the H-bridge is connected via a first storage choke and the third semiconductor switch of the H-bridge is connected via a second storage choke to a first AC voltage terminal, and the second semiconductor switch of the H-bridge is connected via a third storage choke and the fourth semiconductor switch of the H-bridge is connected via a fourth storage choke to a second AC voltage terminal. The freewheeling path additionally comprises another H-bridge having four auxiliary semiconductor switches, the first auxiliary semiconductor switch of the additional H-bridge being connected via the first storage choke and the third auxiliary semiconductor switch of the additional H-bridge being connected via the second storage choke to the first AC voltage terminal, and the second auxiliary semiconductor switch of the other H-bridge being connected via the third storage choke and the fourth auxiliary semiconductor switch of the additional H-bridge being connected via the fourth storage choke to the second AC voltage terminal.

The advantage of such a connection of the H-bridge and the additional H-bridge to the two AC voltage terminals via four storage chokes is that during both a positive and a negative alternation of the AC voltage a freewheeling path is available without using the parasitic diodes in the auxiliary semiconductor switches, thereby avoiding losses which are otherwise caused by the generally slow parasitic diodes during freewheeling.

By supplementing this circuit with a transformer as a coupling element it is advantageously provided that the connection of the third and fourth auxiliary semiconductor switch and the connection of the first and second auxiliary semiconductor switch are connected via a series circuit comprising a first freewheeling diode and a resonant choke, that a series circuit comprising a second freewheeling diode and a freewheeling capacitor is disposed in parallel with the first freewheeling diode, that a connection point between second freewheeling diode and freewheeling capacitor is additionally connected to the connection of the first and second auxiliary semiconductor switch via a series circuit comprising a third diode and a fourth diode, that there is disposed in parallel with the third diode a secondary winding of a transformer which additionally comprises two primary windings, the first primary winding being connected at one end to the connection of the first and second semiconductor switch of the H-bridge and at the other end via a first resonant capacitor to the connection between first semiconductor switch and first storage choke and via a second resonant capacitor to the connection between second semiconductor switch and third storage choke, and the second primary winding being connected at one end to the connection of the third and fourth semiconductor switch of the H-bridge and at the other end via a third resonant capacitor to the connection between third semiconductor switch and second storage choke and via a fourth resonant capacitor to the connection between fourth semiconductor switch and fourth storage choke.

In another embodiment variant, one half of the H-bridge is connected via a first storage choke to a first AC voltage terminal and the other half of the H-bridge is connected via a second storage choke to a second AC voltage terminal. The freewheeling path additionally comprises another H-bridge having four auxiliary semiconductor switches, one half of the additional H-bridge being connected via the first storage choke to the first AC voltage terminal and the other half of the additional H-bridge being connected via the second storage choke to the second AC voltage terminal.

Such a circuit having only two storage chokes at the inverter outputs is advisable if the auxiliary semiconductor switches have fast parasitic diodes, thereby minimizing the losses during freewheeling. In both of the above embodiment variants, the first and fourth semiconductor switches switch during a positive alternation and the second and third semiconductor switches switch during a negative alternation.

For both of the aforementioned embodiment variants, as an alternative to a transformer as coupling element, a supplemental circuit is advantageous in which the connection of the third and fourth auxiliary semiconductor switch and the connection of the first and second auxiliary semiconductor switch are connected via a series circuit comprising a second resonant choke, the first freewheeling diode and a first resonant choke, and in which there is disposed in parallel with the first freewheeling diode a series circuit comprising a second freewheeling capacitor, the second freewheeling diode and a first freewheeling capacitor. In addition, a connection point between second freewheeling diode and first freewheeling capacitor is connected to the connection of the first and second auxiliary semiconductor switch via a series circuit comprising a third diode and a fourth diode, and the connection of the third and fourth auxiliary semiconductor switch is connected to a connection point between second freewheeling diode and second freewheeling capacitor via a sixth diode and a fifth diode. In addition, a connection point between third and fourth diode is connected to the connection of the first semiconductor switch and the second semiconductor switch via a first resonant capacitor and a connection point between fifth and sixth diode is connected via a second resonant capacitor to the connection of the third semiconductor switch and the fourth semiconductor switch.

Simple diode circuits are therefore disposed as coupling elements between the resonant capacitors, the resonant chokes and the freewheeling capacitors. The current flows between these components during a switching cycle are such that the diodes in these diode circuits as well as the freewheeling diodes are turned on losslessly, a switching cycle being determined from one turn-on process of a switching semiconductor switch to the next turn-on process.

The first resonant circuit comprising the first resonant capacitor, the first freewheeling capacitor and the first resonant choke is used for zero voltage switching of the first and second semiconductor switch. The second resonant circuit comprising the second resonant capacitor, the second freewheeling capacitor and the second resonant choke is used for zero voltage switching of the third and fourth semiconductor switch, the resonant capacitors being charged to virtually half the input-side DC voltage prior to a turn-on process.

Another embodiment variant of the invention provides that a first H-bridge terminal between first semiconductor switch and fourth semiconductor switch is connected via a first storage choke to a first AC voltage terminal and that a second H-bridge terminal between second semiconductor switch and third semiconductor switch is connected via a second storage choke to a second AC voltage terminal and that the AC voltage terminals are interconnected via a primary winding of a power transformer, that the connection of the third and fourth semiconductor switch is additionally connected to the first H-bridge terminal via a series circuit comprising a first freewheeling diode and first resonant choke, that a series circuit comprising a second freewheeling diode and first freewheeling capacitor is disposed in parallel with the first freewheeling diode, that a series circuit comprising a first resonant capacitor and a fourth diode is disposed in parallel with the first semiconductor switch and that a connection point between second freewheeling diode and first freewheeling capacitor is connected to a connection point between first resonant capacitor and fourth diode via a third diode, that the connection of the third and fourth semiconductor switch is additionally connected to the second H-bridge terminal via a series circuit comprising another first freewheeling diode and second resonant choke, that a series circuit comprising another second freewheeling diode and a second freewheeling capacitor is disposed in parallel with the additional first freewheeling diode, that a series circuit comprising a second resonant capacitor and a fifth diode is disposed in parallel with the second semiconductor switch and that a connection point between the additional second freewheeling diode and the second freewheeling capacitor is connected via a sixth diode to a connection point between second resonant capacitor and fifth diode.

This embodiment variant is therefore implemented as an inverter with power transformer. Generally only one semiconductor switch is in switching mode, namely only the first semiconductor switch during a positive alternation; the third semiconductor switch is always ON and the second and fourth semiconductor switches are always OFF.

During a negative alternation, the second semiconductor switch switches and the fourth semiconductor switches is always ON; the first and the third semiconductor switches are always OFF.

Instead of an additional H-bridge, two freewheeling diodes for the positive alternation and two freewheeling diodes for the negative alternation are provided with corresponding resonant circuits and freewheeling capacitors.

It is beneficial if the DC voltage terminals are interconnected via an input capacitor. This is appropriate particularly if a fluctuating energy source such as a solar generator is connected at the input side.

It is also beneficial if the AC voltage terminals are interconnected via an output capacitor to smooth the output-side AC voltage.

A method for operating one of the above-described inverters provides that, at the start of a switching cycle, at least one semiconductor switch of the H-bridge is turned on, that in the process the input-side DC voltage is pulled to the inductive resonant elements of the respective resonant circuit, thereby causing the current still flowing as freewheeling current through the inductive resonant elements to decrease and reverse its direction and that, by means of this current, energy is then transferred from the capacitive resonant elements to the capacitive freewheeling elements, that when a predefined ON-time has elapsed the at least one switching semiconductor switch is turned off again and at least part of the freewheeling current flows through the second freewheeling diode, the capacitive freewheeling elements and the inductive resonant elements until the capacitive freewheeling elements are discharged and the remaining freewheeling current flows through the first freewheeling diode and the inductive resonant elements. This provides a passive, low-loss method of reducing the switching losses on semiconductors, particularly IGBTs, of an inverter designed as an H-bridge.

BRIEF DESCRIPTION OF THE DRAWINGS

The invention will now be explained using examples and with reference to the accompanying schematics in which.

DETAILED DESCRIPTION OF INVENTION

Figure 1:
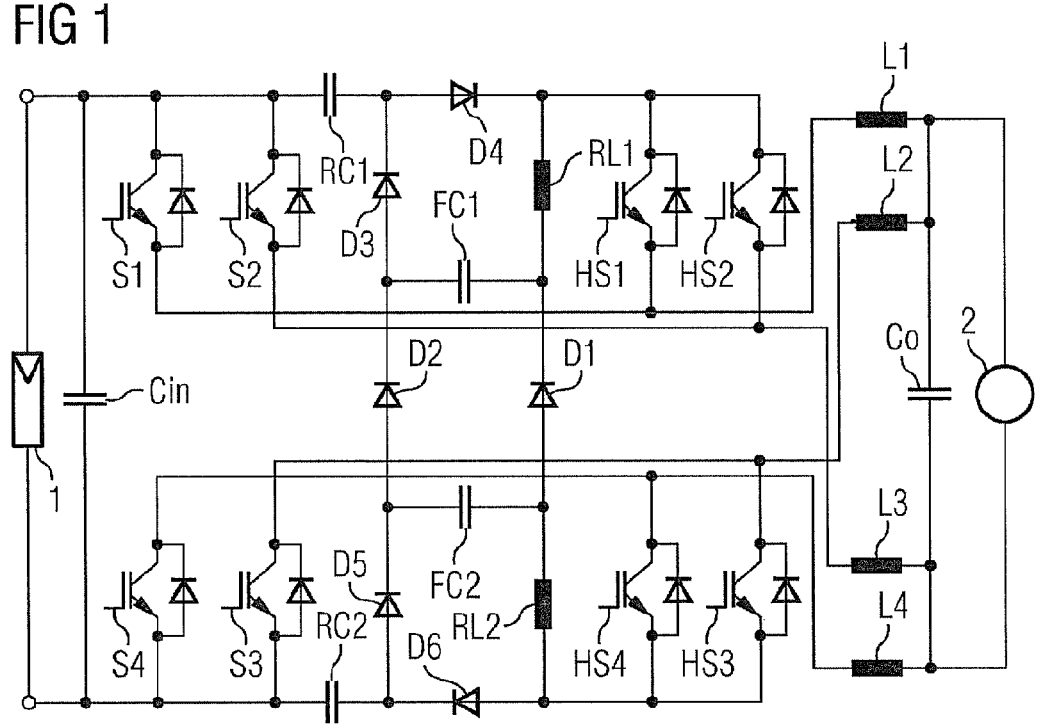
FIG. 1 shows a transformer less H-bridge circuit with four output-side storage chokes and a resonant circuit with diodes as coupling elements

A first embodiment variant of the invention is shown in FIG. 1. In this transformerless implementation, the H-bridge comprising four semiconductor switches S1, S2, S3, S4 is connected on the input side to an energy source 1, e.g. a current source, a voltage source or a nonlinear source (solar generator). Here an input capacitor Cin buffers the energy in a predefined voltage range.

The first semiconductor switch S1 and the third semiconductor switch S3 are connected to a first AC voltage terminal via, respectively, a first storage choke L1 and a second storage choke L2. The second semiconductor switch S2 and the fourth semiconductor switch S4 are connected to a second AC voltage terminal via, respectively, a third storage choke L3 and a fourth storage choke L4. A load system 2, for example, is connected to the two inverter terminals, an output capacitor Co being used to smooth the current fed into said load system 2.

Another H-bridge comprising four auxiliary semiconductor switches HS1, HS2, HS3, HS4 is arranged as part of a freewheeling circuit. Said auxiliary semiconductor switches HS1, HS2, HS3, HS4 are connected in parallel with the semiconductor switches S1, S2, S3, S4 of the first H-bridge to the four storage chokes L1, L2, L3, L4. The semiconductor switches S1, S2, S3, S4 and the auxiliary semiconductor switches HS1, HS2, HS3, HS4 are numbered clockwise as is customary for H-bridge representation. The semiconductor switches S1, S2, S3, S4 and auxiliary semiconductor switches HS1, HS2, HS3, HS4 are implemented as IGBTs, for example. In FIG. 1 they are shown as such with in each case a parasitic diode (body diode).

A double resonant circuit is provided for zero voltage switching of the semiconductor switches S1, S2, S3, S4, one side of a first resonant choke RL1 being connected to the cathode of a fourth diode D4. The anode of said fourth diode D4 is connected to the bridge connection of the first and second semiconductor switch S1, S2 via a first resonant capacitor RC1. This side of the first resonant choke RL1 is additionally connected to the bridge connection of the first and second auxiliary semiconductor switch HS1, HS2. The other side of the first resonant choke RL1 is connected to the cathode of a first freewheeling diode D1 and is also connected via a first freewheeling capacitor FC1 to the cathode of a second freewheeling diode D2 on the one hand and via a third diode D3 to a connection point between first resonant capacitor RC1 and fourth diode D4 on the other. The third diode D3 is here connected in the forward direction from the first freewheeling capacitor FC1 to the first resonant capacitor RC1.

In the same manner, one side of a second resonant capacitor RL2 is connected via a sixth diode D6 and a second resonant capacitor RC2 to the bridge connection between third and fourth semiconductor switch S3, S4, said sixth diode D6 being connected in the forward direction from the second resonant choke RL2 to the second resonant capacitor RC2. This side of the second resonant choke RL2 is also connected to the bridge connection between third and fourth auxiliary semiconductor switch HS3, HS4. The other side of the second resonant choke RL2 is connected to the anode of the first freewheeling diode D1 on the one hand and via a second freewheeling capacitor FC2 to the anode of the second freewheeling diode D2 on the other. In addition, a fifth diode D5 is connected in the forward direction from the second resonant capacitor RC2 to the second freewheeling capacitor FC2.

Figure 2:
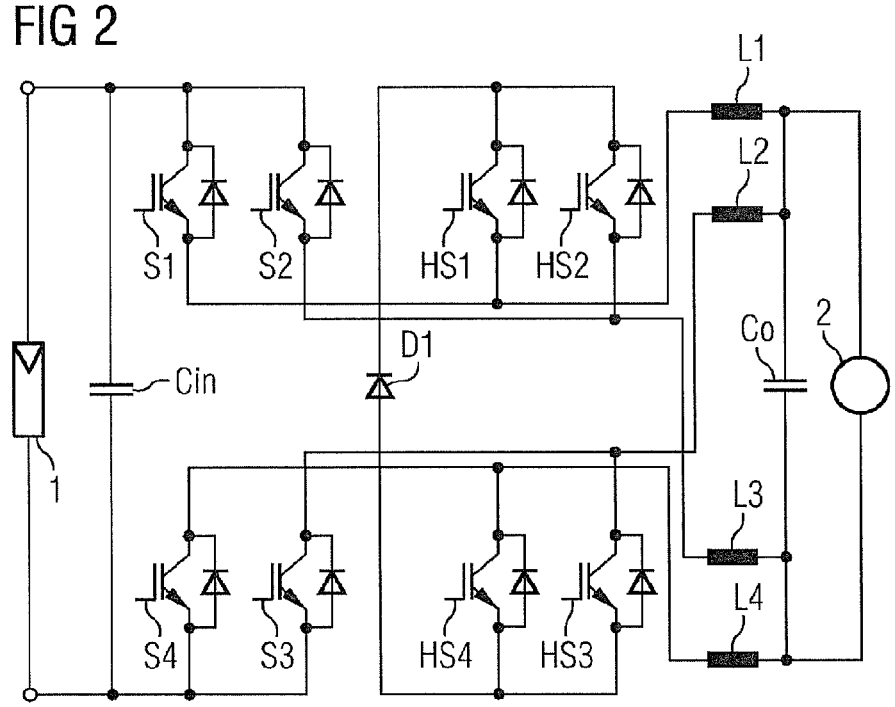
FIG. 2 shows a transformerless H-bridge circuit comprising four output-side storage chokes without resonant circuit

For the sake of simplicity, the current flows during a freewheeling phase will be explained on the basis of an H-bridge without resonant circuit. A corresponding circuit arrangement is shown in FIG. 2. As compared with FIG. 1, instead of the elements of the resonant circuit and freewheeling path, only one freewheeling diode D1 is shown which connects the bridge connection of the third and fourth auxiliary semiconductor switch HS3, HS4 to the bridge connection of the first and second auxiliary semiconductor switch HS1, HS2 in the forward direction.

The main circuit consists of an H-bridge whose semiconductor switches S1, S2, S3, S4 are switched at a predefined switching frequency by means of a controller. The auxiliary switching elements HS1, HS2, HS3, HS4 are turned on and off in a controlled manner at a predefined system frequency (e.g. 50 Hz), the switching frequency being a multiple higher than the system frequency.

After turn-off of the semiconductor switches S1, S4 during a positive alternation or, as the case may be, S2, S3 during a negative alternation, the circuit enables the freewheeling current of the storage chokes L1, L2, L3, L4 to flow only through the rectifier diode D1 and not through the more slowly switching parasitic diodes of the auxiliary semiconductor switches HS1, HS2, HS3, HS4.

Figure 3:
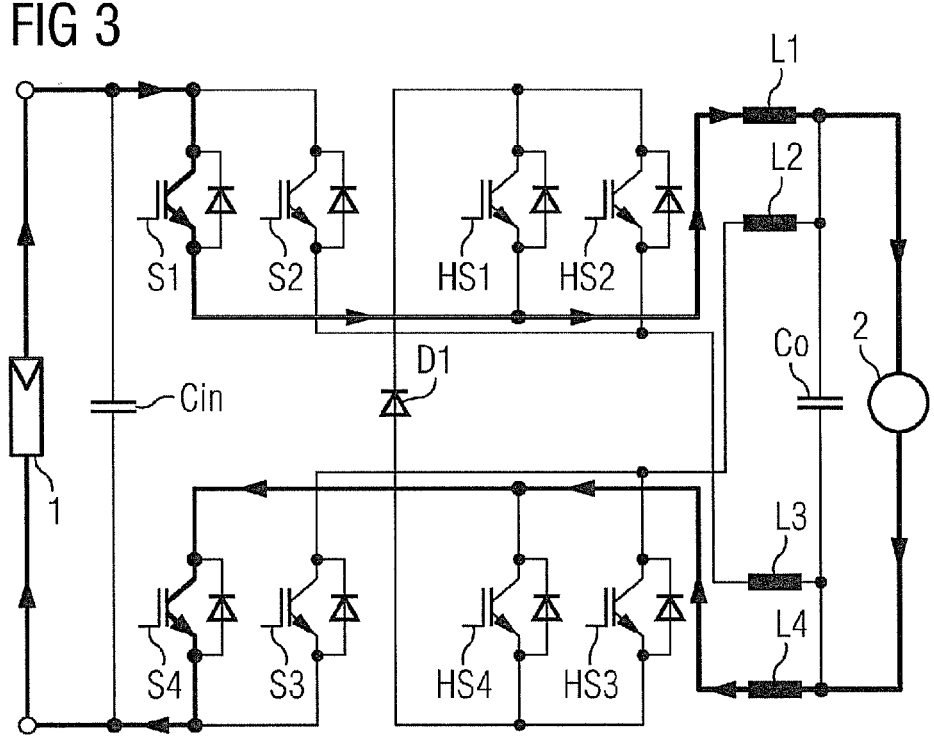
FIGS. 3-6 show the circuit according to FIG. 2 with current flows during a switching cycle
Figure 4:
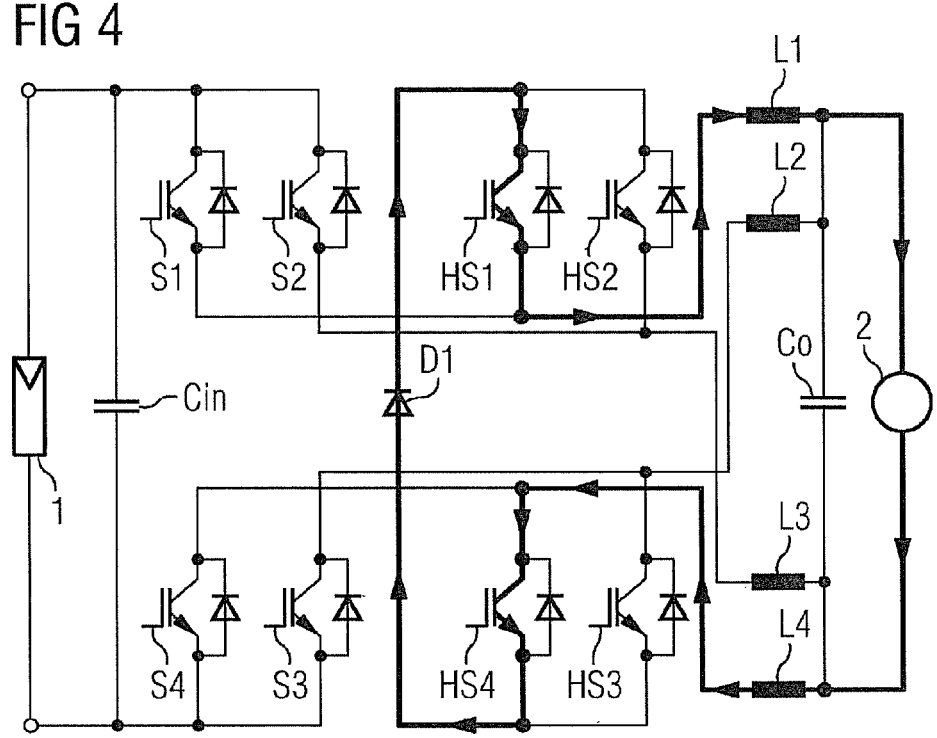

FIGS. 3 and 4 show the switching phases during a positive alternation of the output-side AC. The first and fourth semiconductor switches S1, S4 are switched at the switching frequency, the second and third semiconductor switches S2, S3 remain OFF. The first and fourth auxiliary semiconductor switches HS1, HS4 are always ON during a positive alternation, the two other auxiliary semiconductor switches HS2, HS3 are either OFF or switch inversely to the switching semiconductor switches S1, S4 of the first H-bridge.

During an ON phase (FIG. 3), the first and fourth semiconductor switches S1, S4 are ON. The current flows from the energy source 1 through the first semiconductor switch S1, the first storage choke L1, a connected system 2 and returns via the fourth storage choke L4 and the fourth semiconductor switch S4 to the energy source 1.

During an OFF phase (FIG. 4), the first and fourth semiconductor switches S1, S4 are OFF. The freewheeling current of the first and fourth storage choke L1, L4 flows through the freewheeling diode D1, the first and fourth auxiliary semiconductor switch HS1, HS4 and via the system 2.

Figure 5:
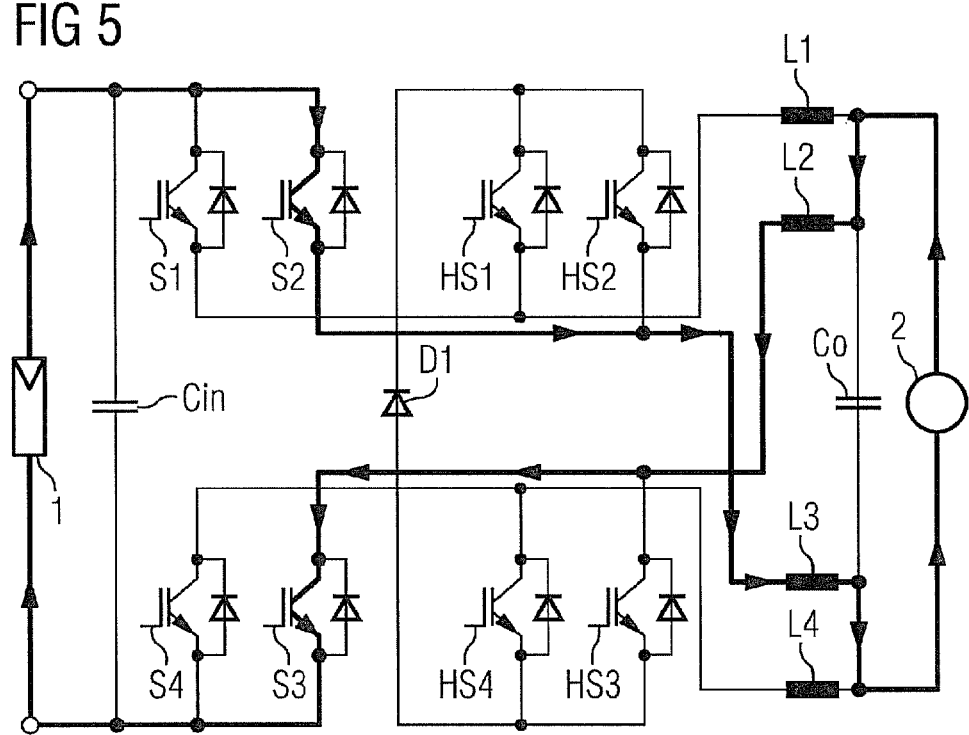
Figure 6:
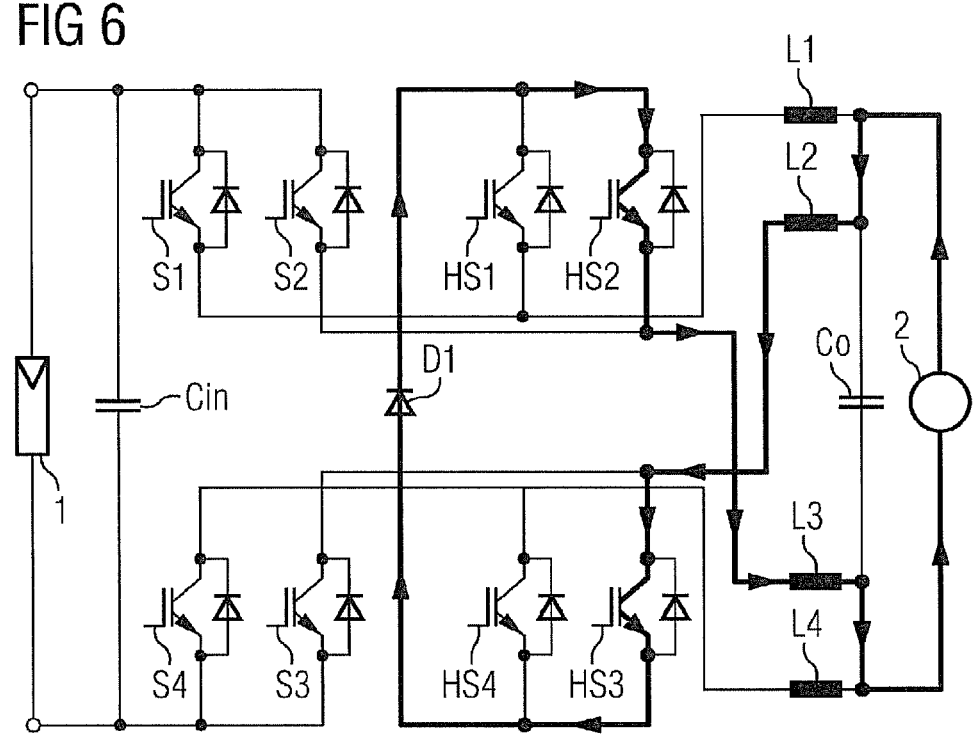

In a similar manner to the switching phases during a positive alternation, FIGS. 5 and 6 show the switching phases during a negative alternation. The first and fourth semiconductor switches S1, S4 are always OFF during a negative alternation. The second and third semiconductor switches S2, S3 switch at the switching frequency. The first and fourth auxiliary semiconductor switches HS1, HS4 are either OFF or switch inversely to the switching semiconductor switches S2, S3 of the first H-bridge. The two other auxiliary semiconductor switches HS2, HS3 are always ON during a negative alternation.

During an ON phase (FIG. 5), the current from the energy source 1 flows through the second semiconductor switch S2, the third storage choke L3, the connected system 2 and returns via the second storage choke L2 and the third semiconductor switch S3 to the energy source 1.

In a subsequent OFF phase (FIG. 6), the second and third semiconductor switches S2, S3 are OFF. The freewheeling current of the second and third storage choke L2, L3 again flows through the freewheeling diode D1 and also through the second and third auxiliary semiconductor switches HS2, HS3 and via the system 2.

In order to be able to explain the resonant switching behavior of a circuit according to FIG. 1 more clearly, a switching cycle (a sequence comprising an ON phase and an OFF phase) will be subdivided below into a plurality of time periods.

Figure 12:
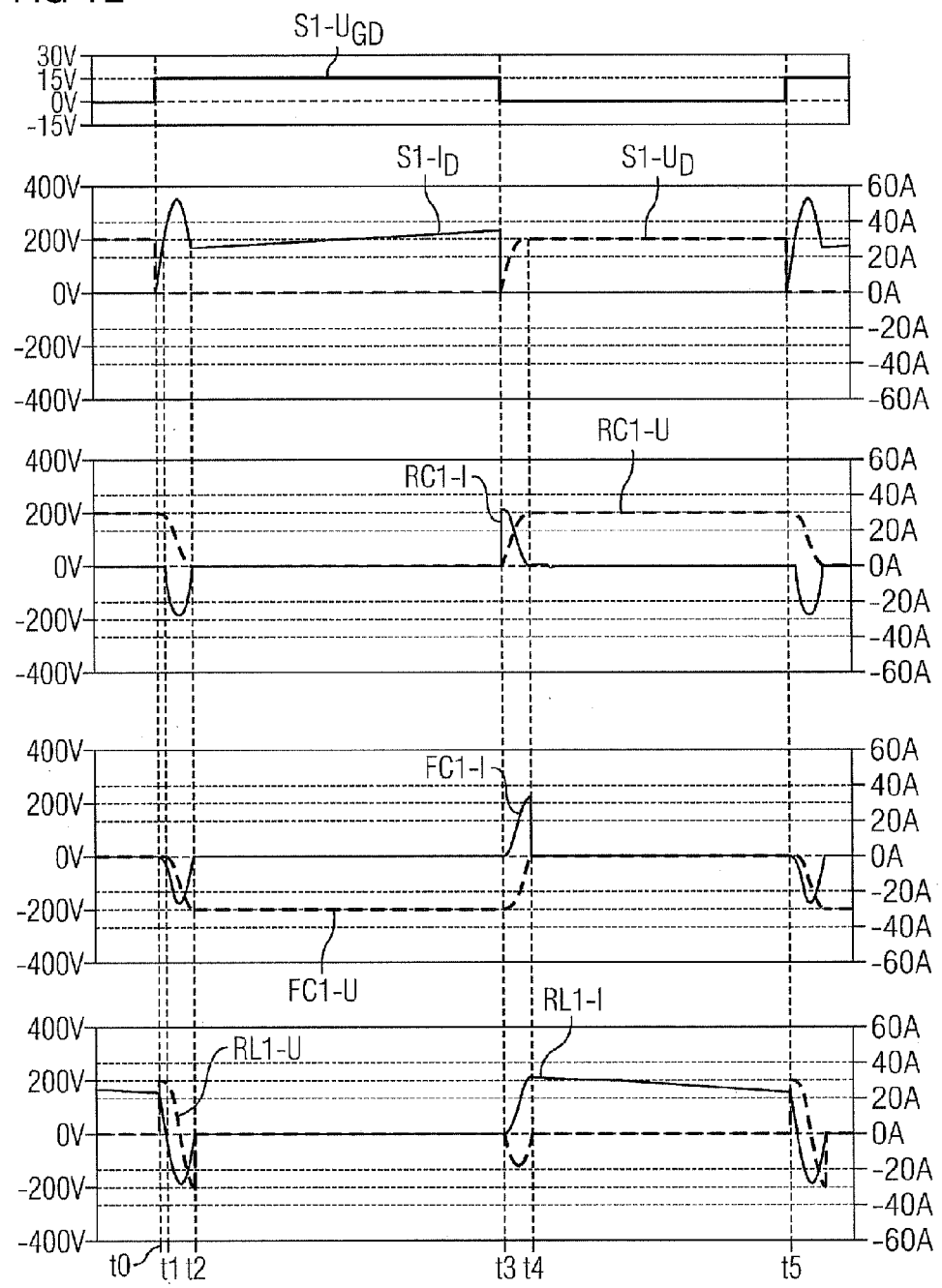
FIGS. 12-14 show current and voltage waveforms over time for a circuit according to FIG. 1
Figure 13:
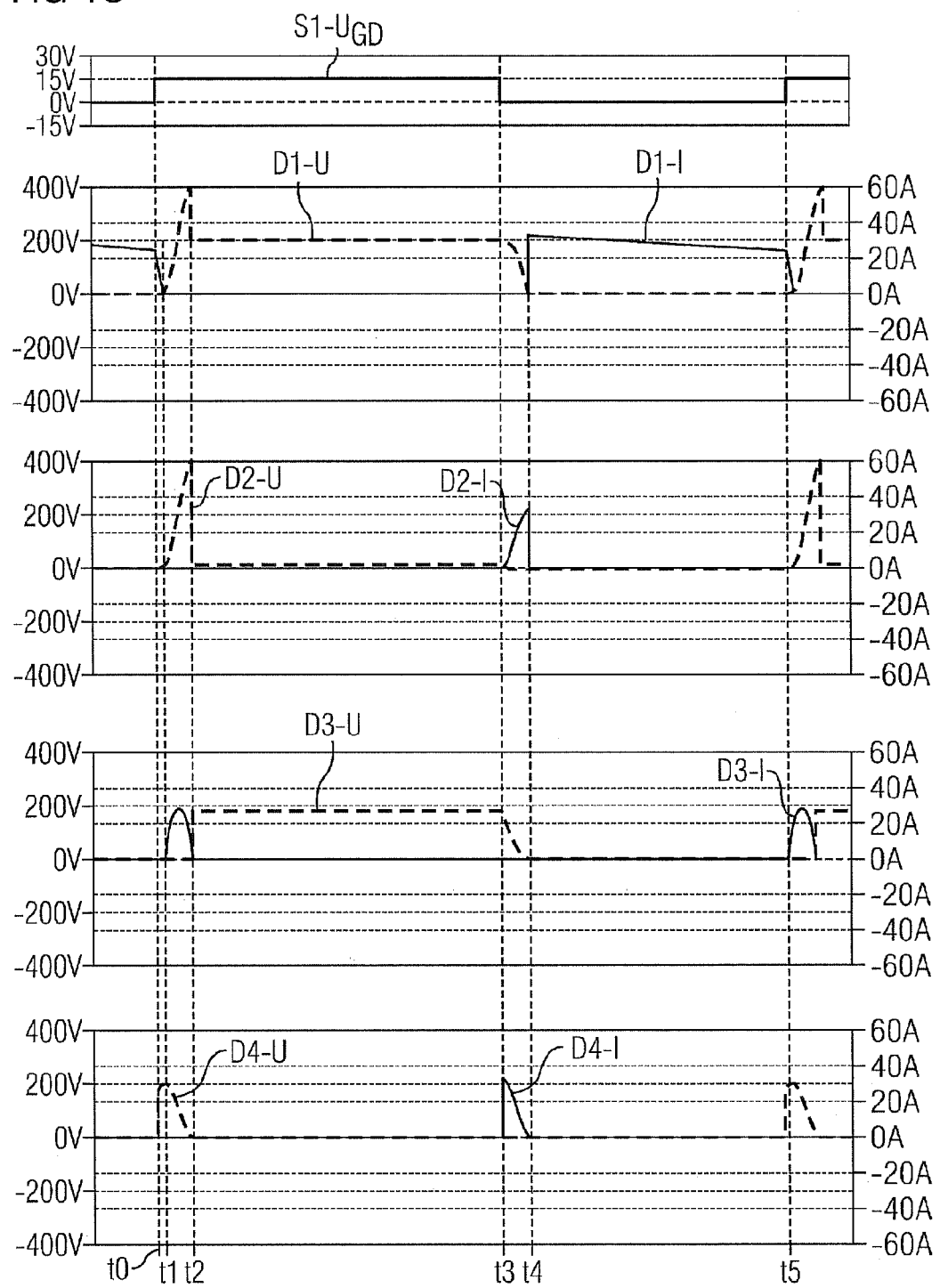
Figure 14:
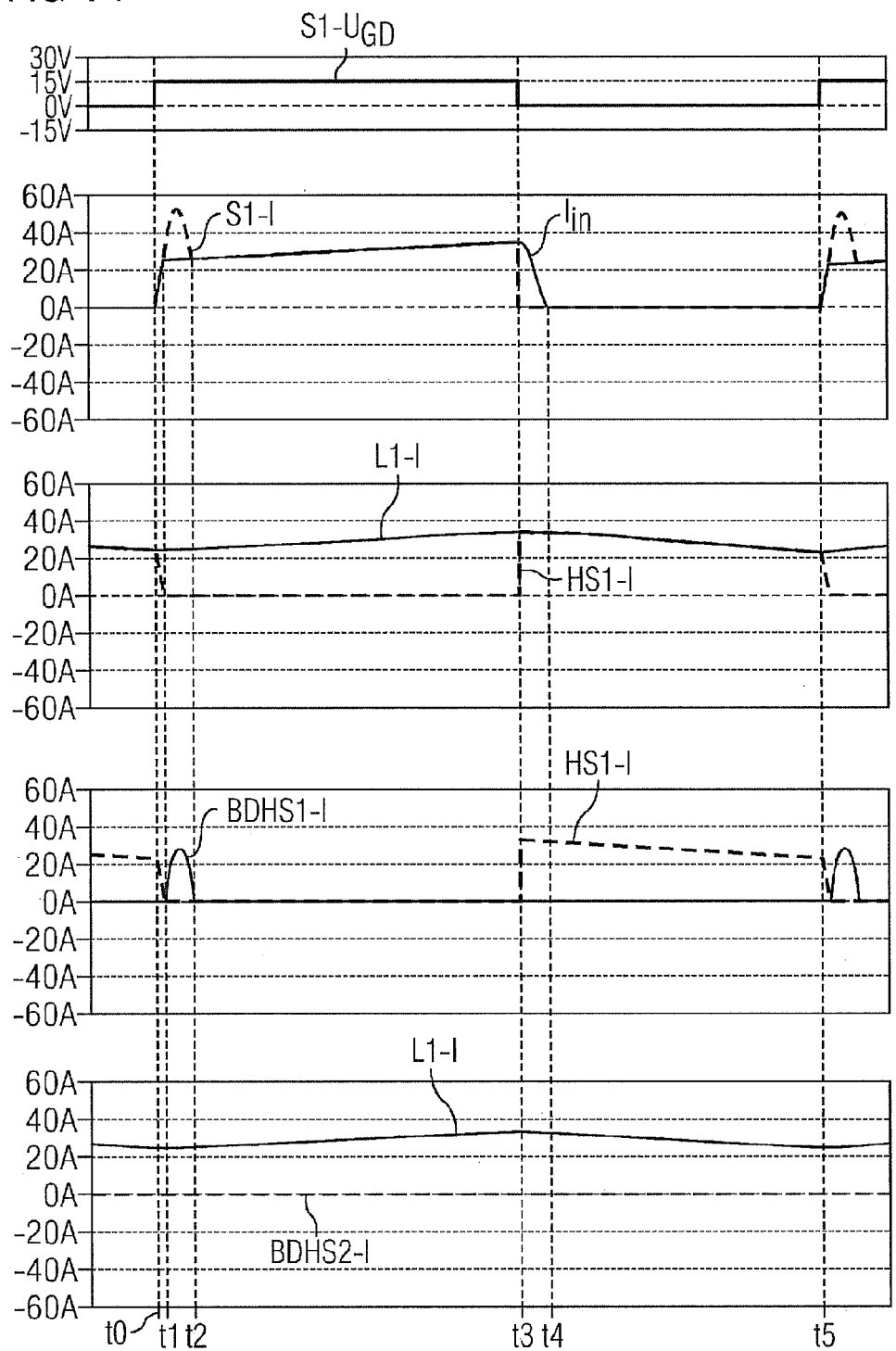

FIGS. 7 to 11 show the embodiment variant comprising resonant circuits as described in the introduction (FIG. 1), the current flows occurring in individual time periods during a positive alternation being indicated. The corresponding current and voltage waveforms over time are shown in FIGS. 12 to 14.

Figure 7:
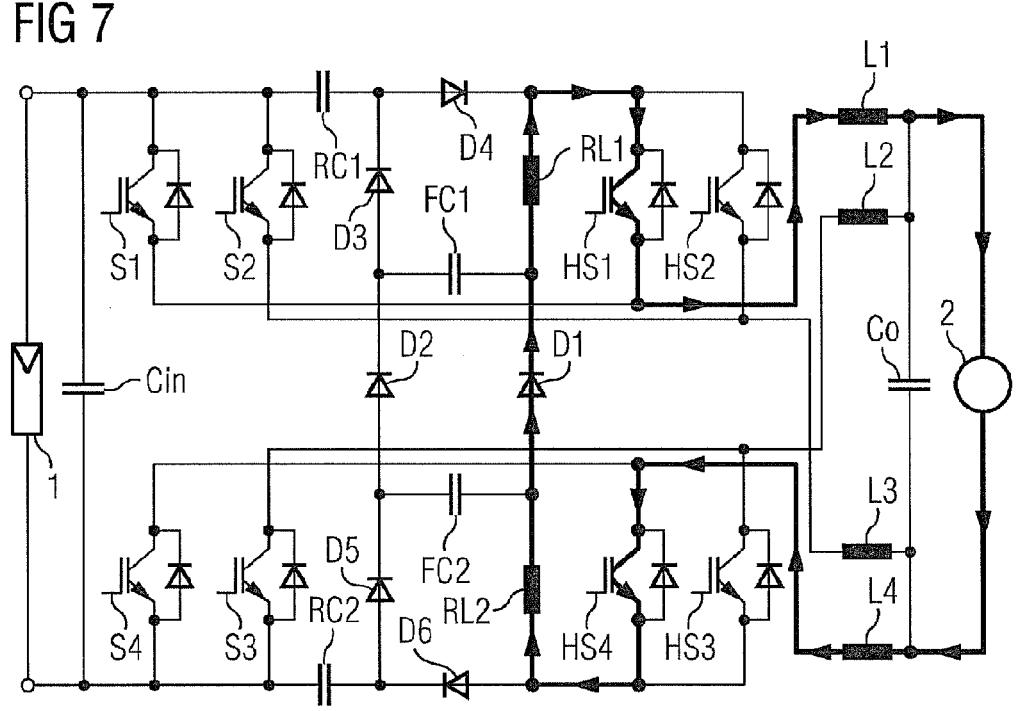
FIGS. 7-11 show the circuit according to FIG. 1 with current flows during a switching cycle

A switching cycle begins at turn-on instant t0 with the turning-on of the first and fourth semiconductor switches S1, S4, it being assumed here that shortly before turn-on the freewheeling current of the first and fourth storage choke L1, L4 is flowing through the first freewheeling diode D1 via the first and fourth auxiliary semiconductor switches HS1, HS4 and the first and second resonant choke RL1, RL2. In addition, the first resonant capacitor RC1 is charged to virtually half the voltage of the input capacitor Cin (or, as the case may be, half the voltage of a solar generator connected at the input side, for example), the negative potential of the first resonant capacitor RC1 being dropped across the anode of the fourth diode D4. The second resonant capacitor RC2 is likewise charged to half the voltage of the input capacitor Cin (or, as the case may be, half the voltage of a solar generator connected at the input side, for example), its positive potential being dropped across the cathode of the sixth diode D6 (FIG. 7).

Figure 8:
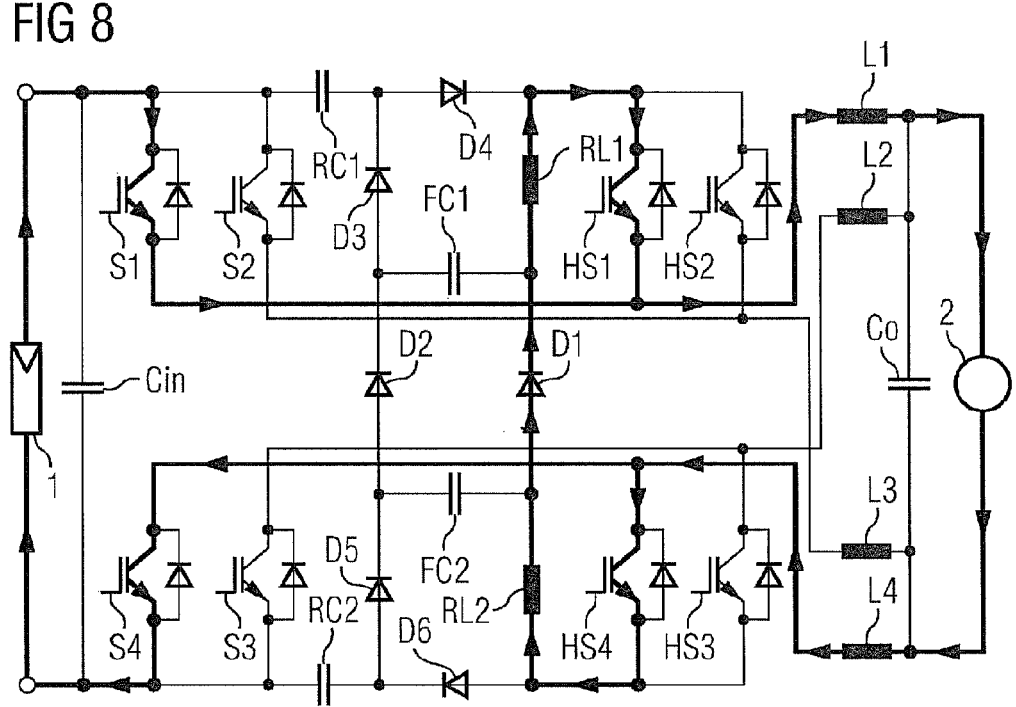
Figure 9:
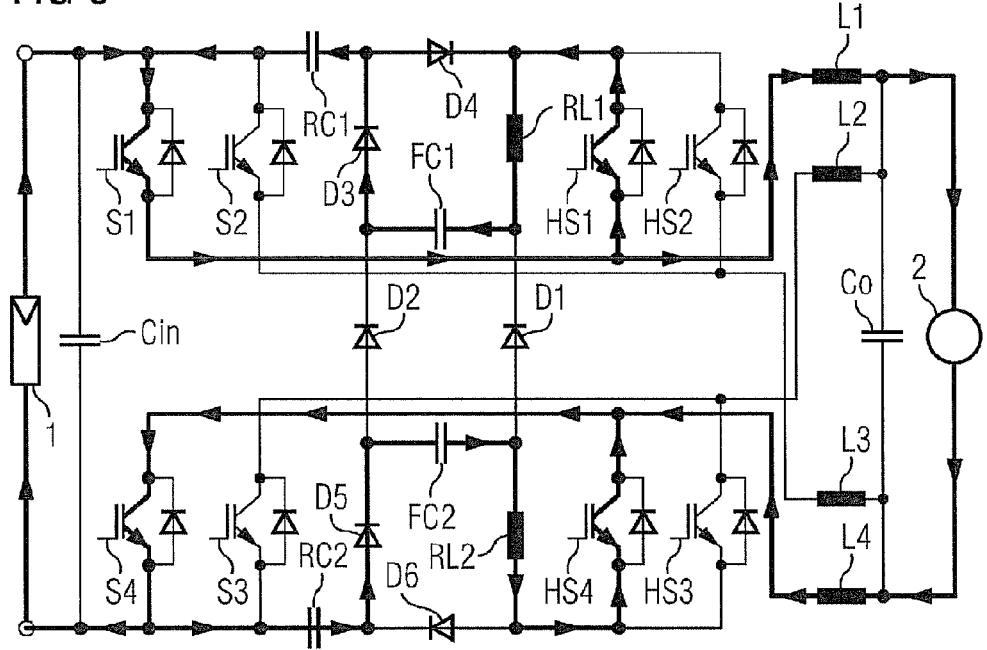
Figure 10:
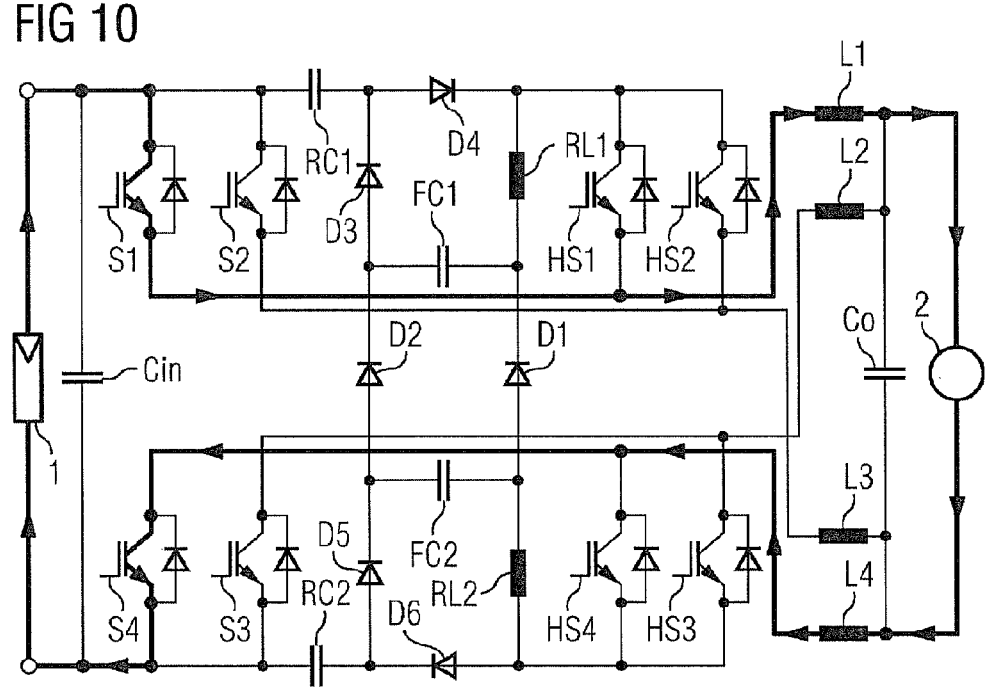
Figure 11:
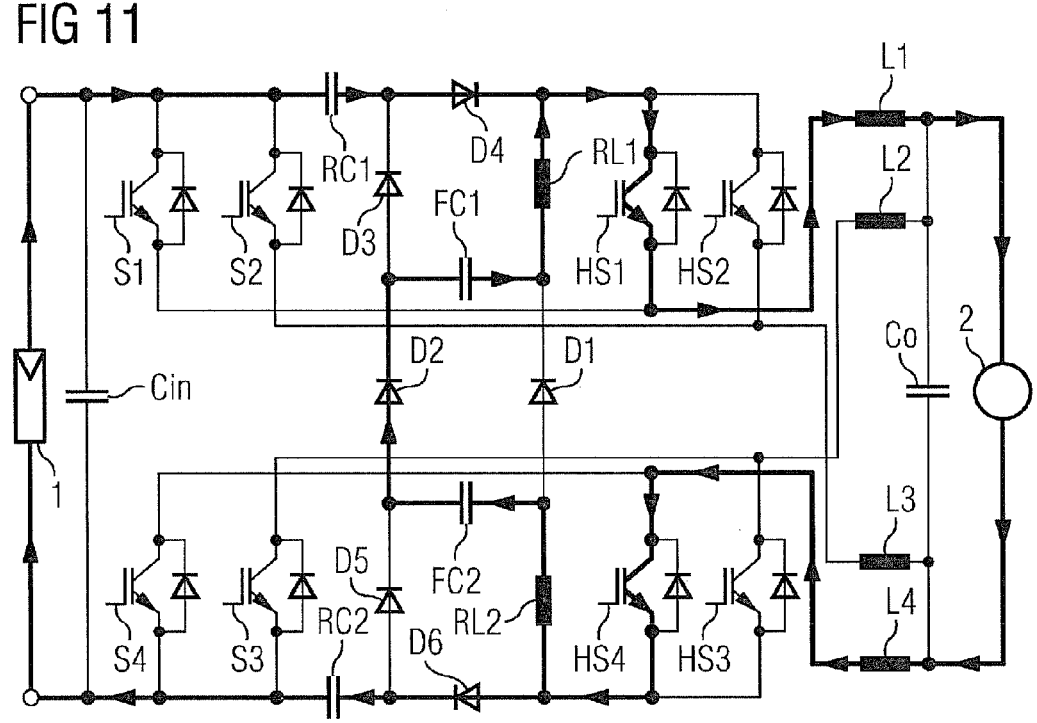

A first time period t0-t1 is shown in FIG. 8. The first and fourth semiconductor switches S1, S4 are ON in this case. The current from the input-side energy source 1 flows through the first and fourth storage choke L1, L4 via the first and fourth semiconductor switch S1, S4. With turn-on of the first semiconductor switch S1, a first resonant circuit consisting of the first resonant capacitor RC1, the first resonant choke RL1 and the first freewheeling capacitor FC1 is also activated, the resonant frequency $\omega_0$ being calculated from the following formula:

$$\omega_0^2 = 1/(((RC1*FC1)/(RC1+FC1))*RL1)$$

The same applies to a second resonant circuit comprising the second resonant capacitor RC2, the second resonant choke RL2 and the second freewheeling capacitor FC2, which is activated by the turning-on of the fourth semiconductor switch S4.

Turn-on of the first semiconductor switch S1 causes the potential at the emitter of the first auxiliary semiconductor switch HS1 to increase massively, the first resonant choke RL1 dissipating its stored energy by driving its current into a very high voltage (the two resonant chokes RL1, RL2 are virtually at the input-side voltage). After a very short time these two inductors RL1, RL2 have built up their magnetic field. As a result, the freewheeling current in the first freewheeling diode D1 falls to virtually zero via the two resonant chokes RL1, RL2.

The corresponding current and voltage waveforms over time are illustrated in FIGS. 12-14, the top diagram in each case showing the gate-source voltage S1-$U_{GD}$ across the first semiconductor switch S1. Below this in FIG. 12 is a waveform diagram of the drain current S1-$I_D$ and drain voltage S1-$U_D$ of the first semiconductor switch S1. This is followed by, from top to bottom, a waveform diagram of the current RC1-I and voltage RC1-U of the first resonant capacitor RC1 over time, a waveform diagram of the current FC1-I and voltage FC1-U of the first freewheeling capacitor FC1 over time, and a waveform diagram of the current RL1-I and voltage RL1-U of the first resonant choke RL1 over time.

FIG. 13 shows, from top to bottom, the current D1-I and voltage D1-U of the first freewheeling diode D1, the current D2-I and voltage D2-U of the second freewheeling diode D2, the current D3-I and voltage D3-U of the third diode D3, and the current D4-I and voltage D4-U of the fourth diode D4.

Finally, FIG. 14 shows, from top to bottom, a waveform diagram of the current S1-I through the first semiconductor switch S1 and of the input current $I_{in}$ over time, a waveform diagram of the current L1-I in the first storage choke L1 (output current) and of the current HS1-I through the first auxiliary semiconductor switch HS1 over time, a waveform diagram of the current BDHS1-I through the parasitic diode of the first auxiliary semiconductor switch HS1 and of the current HS1-I through the first auxiliary semiconductor switch HS1 over time, and a waveform diagram of the current BDSH2-I through the parasitic diode of the second auxiliary semiconductor switch HS2 and of the current L1-I in the first storage choke L1 over time.

The above-described reduction of the freewheeling current D1-I to zero is plotted in FIG. 13 in the first time period t0-t1 which is marked on the time axis of FIGS. 12 to 14.

In a subsequent second time period t1-t2 (FIG. 9, FIGS. 12-14) the direction of the current through the resonant chokes RL1, RL2 reverses. This occurs as soon as the resonant chokes RL1, RL2 have no more energy stored. The current then flows on the one hand via the first freewheeling capacitor FC1 and the third diode D3 into the first resonant capacitor RC1 and, on the other hand, via the second resonant capacitor RC2 and the fifth diode D5 into the second freewheeling capacitor FC2, said resonant capacitors RC1, RC2 being discharged in the process and the energy in the inductors RL1, RL2 increasing again so that an oscillation can take place.

The charge of the first resonant capacitor RC1 oscillates at a half period of the resonant frequency to the first freewheeling capacitor FC1. This occurs due to a flow of current via the first semiconductor switch S1, the parasitic diode of the first auxiliary semiconductor switch HS1, the first resonant choke RL1 and the third diode D3.

Likewise, the charge of the second resonant capacitor RC2 oscillates at a half period of the resonant frequency to the second freewheeling capacitor FC2, the current in this case flowing via the fourth semiconductor switch S4, the fifth diode D5, the second resonant choke RL2 and the parasitic diode of the fourth auxiliary semiconductor switch HS4.

As shown in FIG. 13, the first freewheeling diode D1 turns off with zero voltage and the third and fifth diodes D3, D5 are turned on with zero voltage. Consequently, there is no power loss at these diodes.

In the subsequent third time period t2-t3 (FIG. 10, FIGS. 12-14), the charges of the resonant capacitors RC1, RC2 are transferred completely to the freewheeling capacitors FC1, FC2. The third diode D3 as well as the fifth diode D5 turn off with zero current, preventing further oscillation in the resonant circuits RC1, FC1, RL1 and RC2, FC2, RL2 respectively. The current from the energy source 1 continues to flow in the first and fourth storage chokes L1, L4 via the first and fourth semiconductor switches S1, S4.

At the start of the fourth time period t3-t4 (FIG. 11, FIGS. 12-14), the first and fourth semiconductor switches S1, S4 are turned off under appropriate control (e.g. using the pulse width modulation (PWM) method). The current from the energy source 1 continues to flow via a parallel circuit branch, namely via the resonant capacitors RC1, RC2, via the fourth and sixth diodes D4, D6 and via the first and fourth auxiliary semiconductor switches HS1, HS4, the resonant capacitors RC1, RC2 being charged very rapidly by the current in the storage chokes L1, L4.

The freewheeling capacitors FC1, FC2 simultaneously deliver their charge via the second freewheeling diode D2, the resonant chokes RL1, RL2, the first and fourth auxiliary semiconductor switches HS1, HS4 and the storage chokes L1, L4 to the connected system 2, the freewheeling capacitors FC1, FC2 being completely discharged in the process. As a result the voltage falls continuously to virtually zero between the collector of the first auxiliary semiconductor switch HS1 and the emitter of the fourth auxiliary semiconductor switch HS4 according to the charge increase in the resonant capacitors RC1, RC2 and the charge reduction in the freewheeling capacitors FC1, FC2. In the subsequent fifth time period t4-t5 (FIG. 7, FIGS. 12-14), the first freewheeling diode D1 again assumes the freewheeling current.

At the start of this fifth time period t4-t5, the resonant capacitors RC1, RC2 are fully charged and the current from the energy source 1 falls to zero. At the same time the freewheeling capacitors FC1, FC2 are fully discharged. The second freewheeling diode D2 turns off at zero voltage and the first freewheeling diode D1 turns on at zero voltage. The freewheeling current therefore commutates at zero voltage from the second D2 to the first freewheeling diode D1, without resultant power dissipation. In the next stage, the freewheeling current driven by the large storage chokes L1, L4 flows via the resonant capacitors RL1, RL2 and the first freewheeling diode until the next turn-on instant t5=t0.

For a negative alternation, the same description sequence applies, with the second and third semiconductor switches S2, S3 being in switching mode and with the second and third auxiliary semiconductor switches HS2, HS3 being the ON switches of the freewheel path, and with the current flowing through the second and third storage chokes L2, L3.

Figure 15:
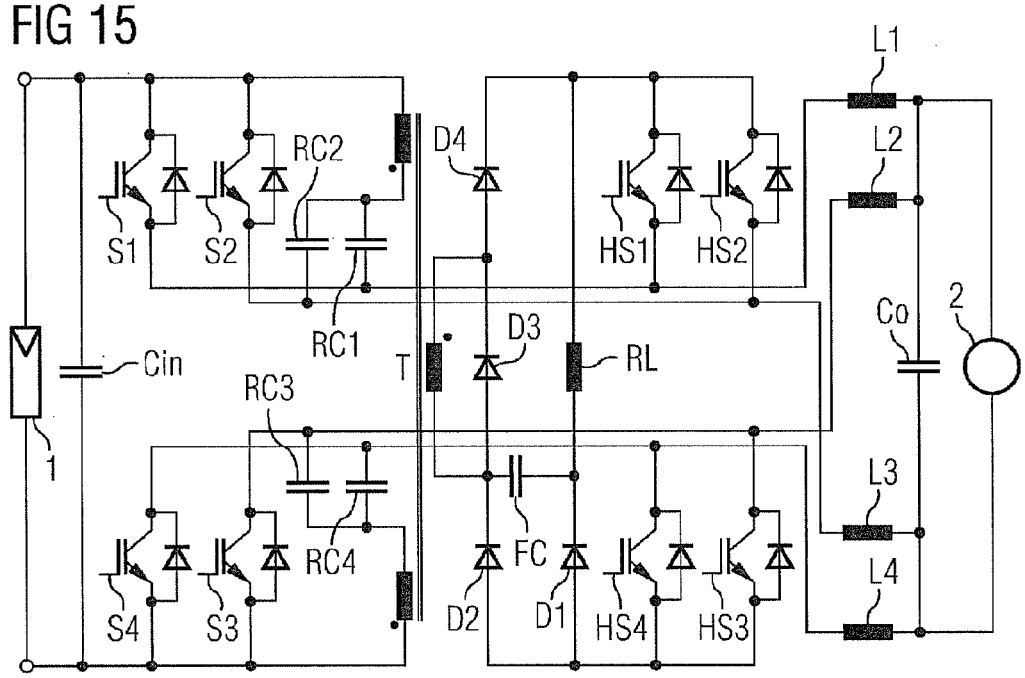
FIG. 15 shows a power transformerless H-bridge circuit with four output-side storage chokes and a resonant circuit with transformer as coupling element

An alternative embodiment variant is shown in FIG. 15. On the basis of a basic circuit according to FIG. 2, a resonant circuit having a transformer T as a coupling element is provided. For this purpose a resonant choke RL is first connected in series with the first freewheeling diode D1. Disposed in parallel with the first freewheeling diode D1 is the second freewheeling diode D2 connected in series with a freewheeling capacitor FC. A connection point between second freewheeling diode D2 and freewheeling capacitor is connected via a third and fourth diode D3, D4 to the bridge connection between first and second auxiliary semiconductor switches HS1, HS2. A secondary winding of the transformer T is here connected in parallel with the third diode, the start of said secondary winding being connected to the cathode of the third diode D3 and the anode of the fourth diode D4. The end of the winding is connected to the cathode of the second freewheeling diode D2 and to one side of the freewheeling capacitor FC.

Additionally mounted to the transformer T are two primary windings wound in diametric opposition to the secondary winding. The first primary winding is connected by the start of the winding, on the one hand, to a connection between first semiconductor switch S1 and first storage choke L1 via a first resonant capacitor RC1 and, on the other hand, to a connection between second semiconductor switch S2 and third storage choke L3 via a second resonant capacitor RC2. The end of the first primary winding is connected to the bridge connection between first and second semiconductor switches S1, S2.

In the same way, the start of the second primary winding is connected to the bridge connection between third and fourth semiconductor switches S3, S4 and the end of the second primary winding is connected, on the one hand, to a connection between third semiconductor switch S3 and second storage choke L2 via a third resonant capacitor RC3 and, on the other hand, to a connection between fourth semiconductor switch S4 and fourth storage choke L4 via a fourth resonant capacitor RC4.

FIGS. 16 to 20 show the current flows during a switching cycle in the above-defined time periods t0-t1, t1-t2, t2-t3, t3-t4 and t4-t5 during a positive alternation.

Figure 16:
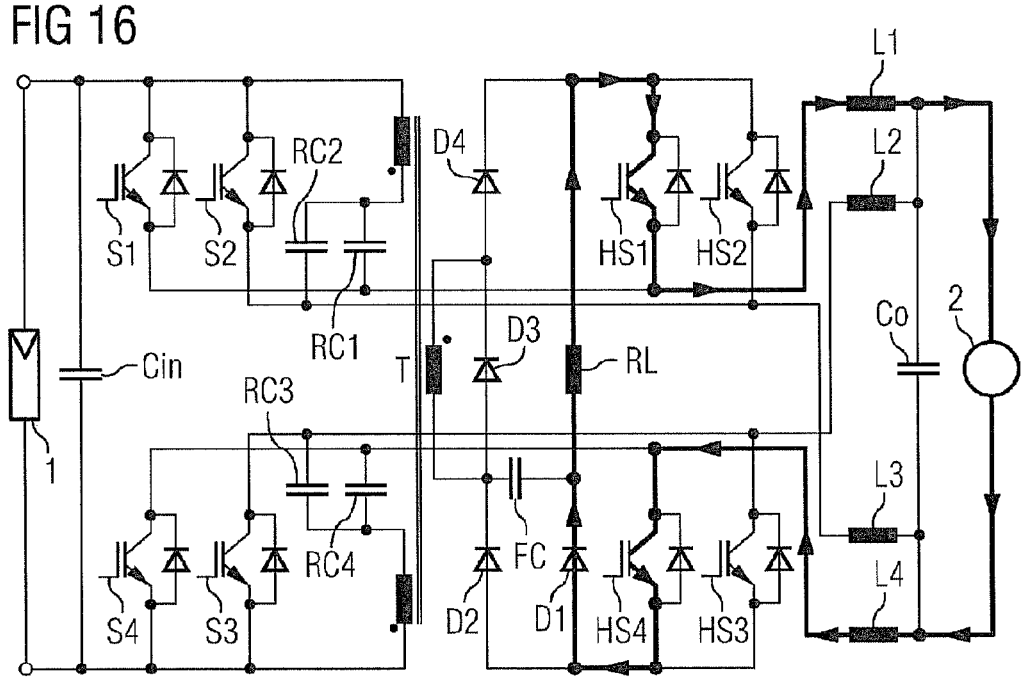
FIGS. 16-20 show the circuit according to FIG. 15 with current flows during a switching cycle

Shortly before turn-on of the first and fourth semiconductor switches S1, S4, the freewheeling current of the first and fourth storage chokes L1, L4 flows via the system, through the first and fourth auxiliary semiconductor switches, the first freewheeling diode D1 and the resonant choke RL (FIG. 16).

Figure 17:
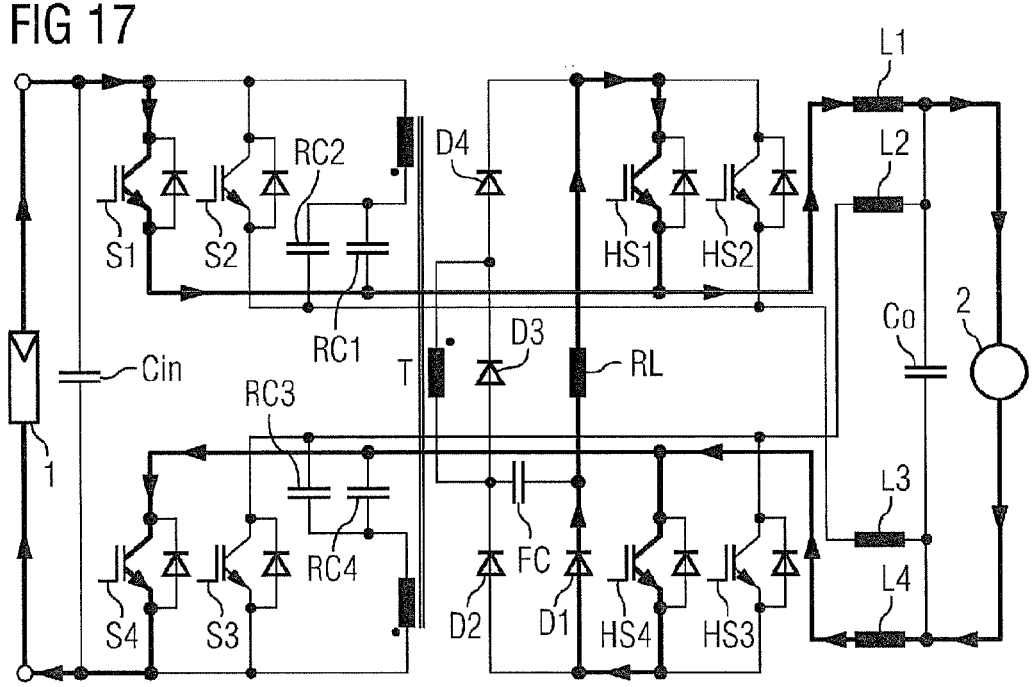

In the first time period t0-t1 after turn-on of the first and fourth semiconductor switches S1, S4, current begins to flow out of the energy source 1 (FIG. 17).

Figure 18:
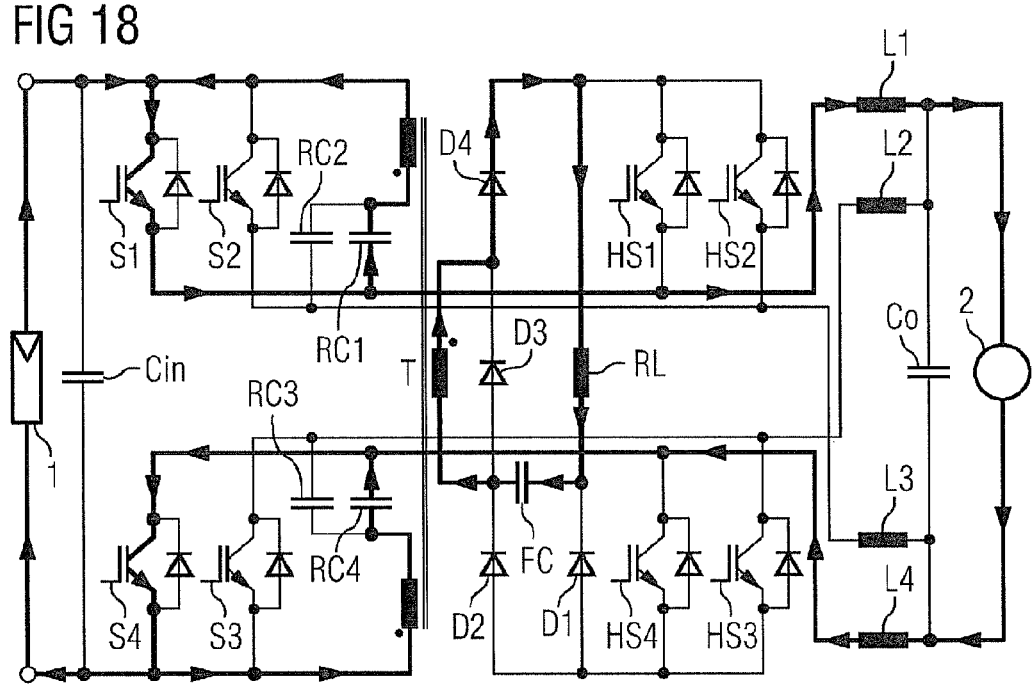

During the subsequent second time period t1-t2, the charges of the second and fourth resonant capacitors RC1, RC4 are transferred via the transformer T, the resonant choke RL and the fourth diode D4 to the freewheeling capacitor FC (FIG. 18).

Figure 19:
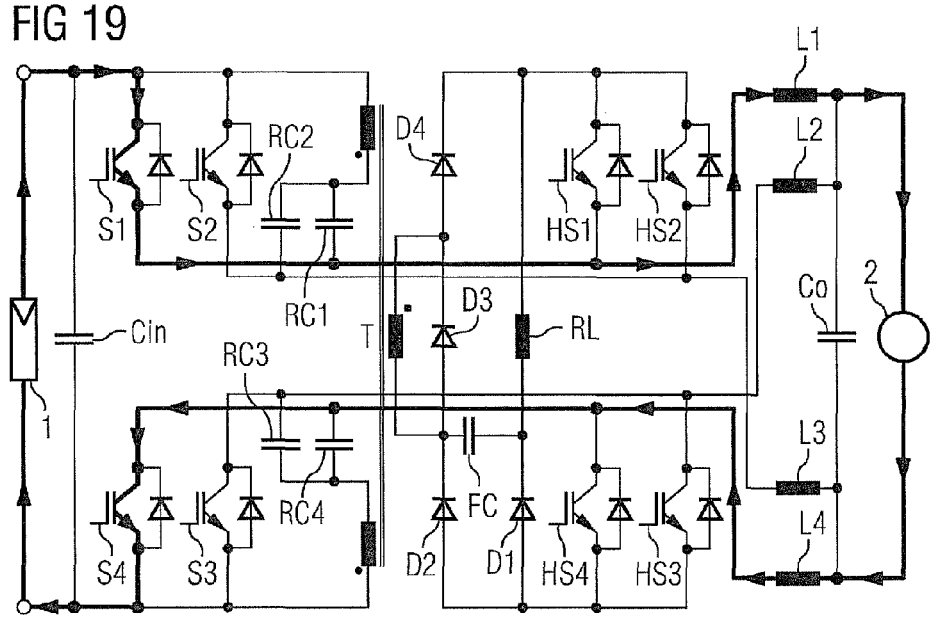

In the third time period t2-t3, current flows from the energy source 1 via the first and fourth semiconductor switches S1, S4 and the first and fourth storage chokes L1, L4 into the connected system 2 (FIG. 19). This time period t2-t3 is terminated with the turn-off of the first and fourth semiconductor switches S1, S4.

Figure 20:
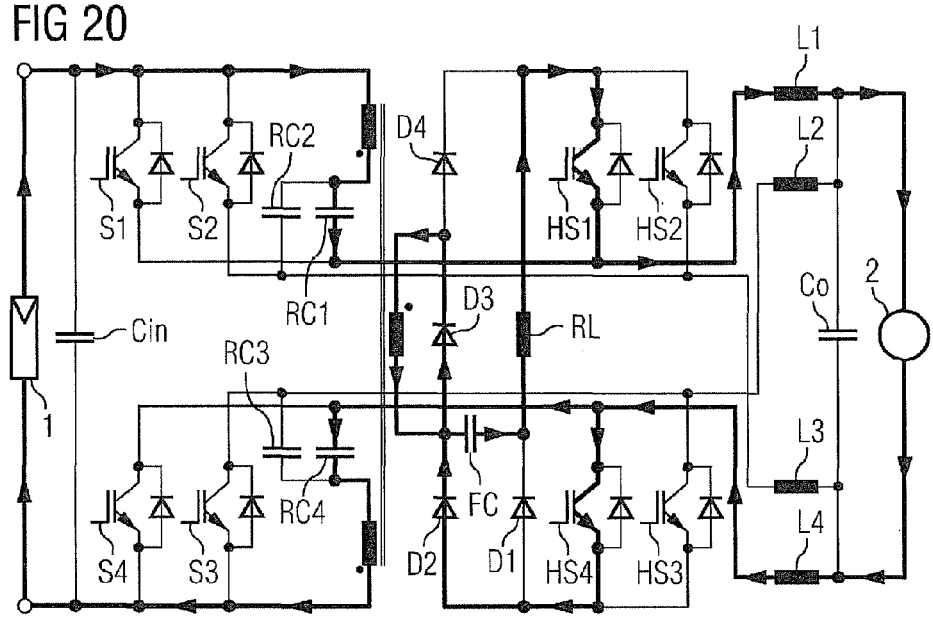

The fourth time period t3-t4 thereby initiated is illustrated in FIG. 20. Current continues to flow from the energy source 1 via the first and fourth resonant capacitors RC1, RC4 and the transformer T, which is in a flux phase, because the third diode D3 disposed on the secondary side is conducting. This continues until the two resonant capacitors RC1, RC4 are charged.

The freewheeling capacitor FC simultaneously delivers its charge via the second freewheeling diode D2, the resonant choke RL and the first and second auxiliary semiconductor switches HS1, HS2 to the load system 2. At the end of this time period t3-t4, the two resonant capacitors RC1, RC4 are fully charged and the current from the energy source 1 falls to zero. At the same time the freewheeling capacitor FC is fully discharged and the freewheeling current commutates at zero voltage from the second freewheeling diode D2 to the first freewheeling diode D1.

In the subsequent fifth time period t4-t5, the freewheeling current of the first and fourth storage chokes L1, L4 flows via the first freewheeling diode D1, the resonant choke RL and the first and fourth auxiliary semiconductor switches HS1, HS4 until the first and fourth semiconductor switches S1, S4 turn on again.

The same processes occur during a negative alternation, with in this case the second and third semiconductor switches S2, S3 switching, the second and third resonant capacitors RC2, RC3 being active and the second and third auxiliary semiconductor switches HS2, HS3 being continuously ON.

The embodiment variants of the invention shown have the advantage that all the switching components involved (semiconductor switches and diodes) are turned on or off either at zero voltage or zero current, thereby minimizing the switching losses of the inverter.

Figure 21:
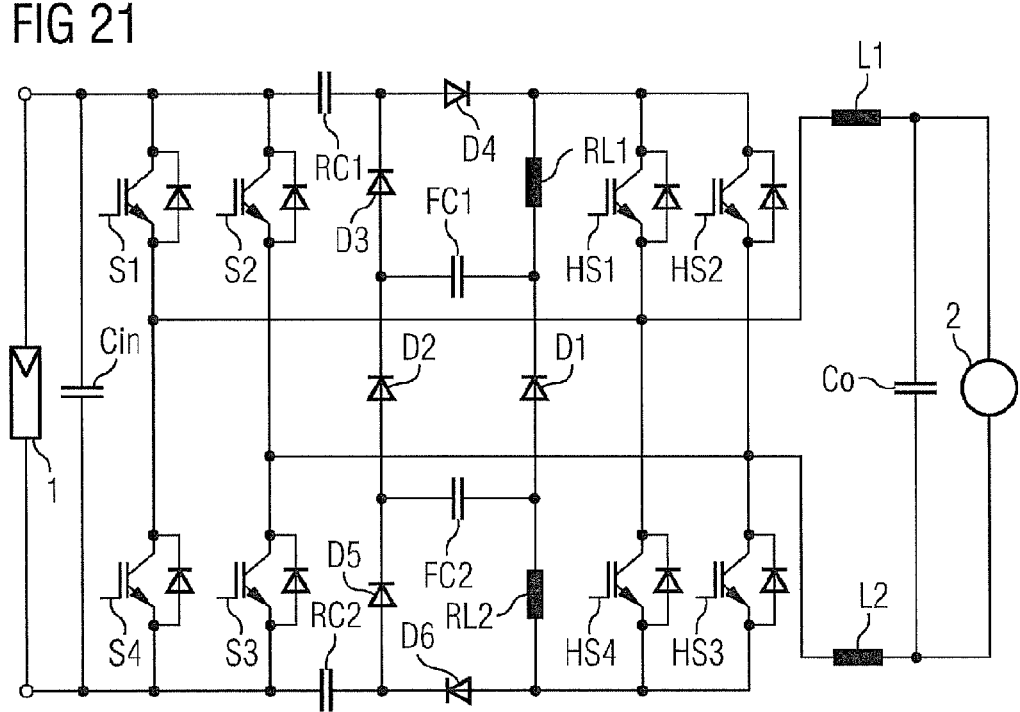
FIG. 21 shows a transformerless H-bridge circuit having two output-side storage chokes and a resonant circuit having diodes as coupling elements
Figure 22:
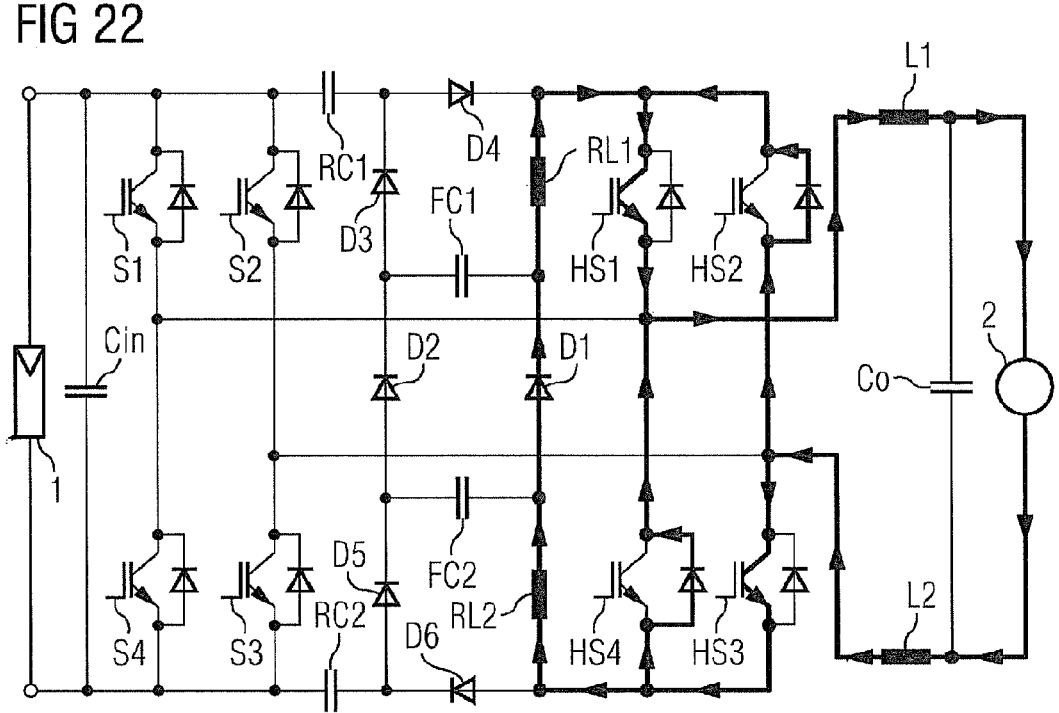
FIGS. 22-26 show the circuit according to FIG. 21 with current flows during a switching cycle
Figure 23:
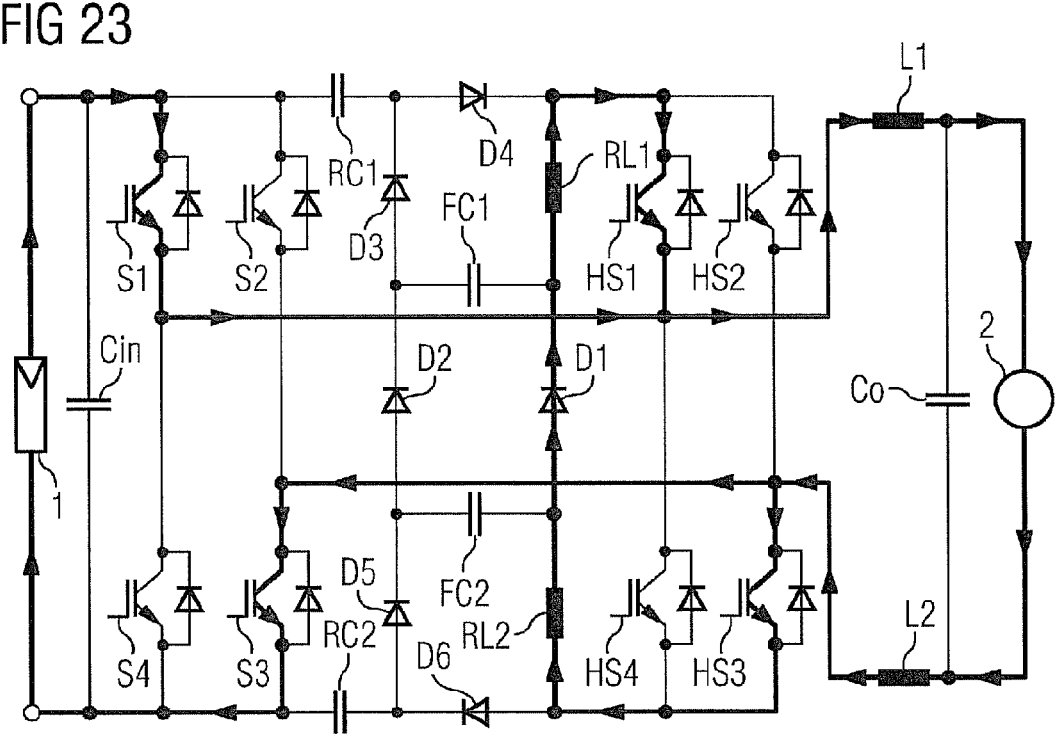
Figure 24:
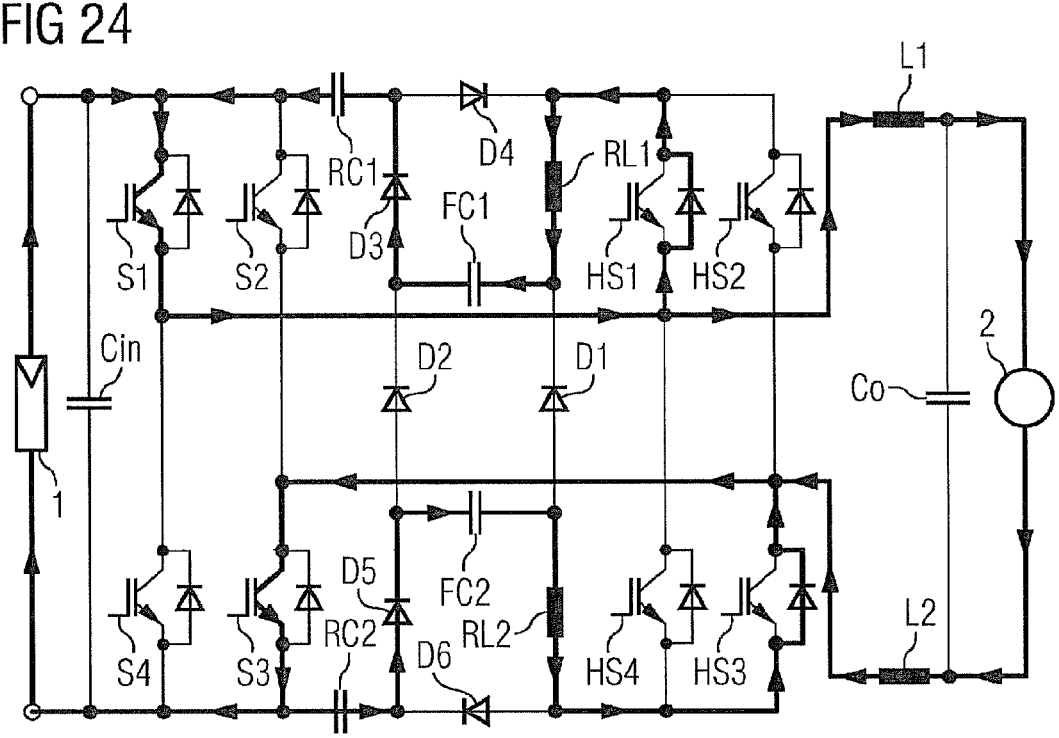
Figure 25:
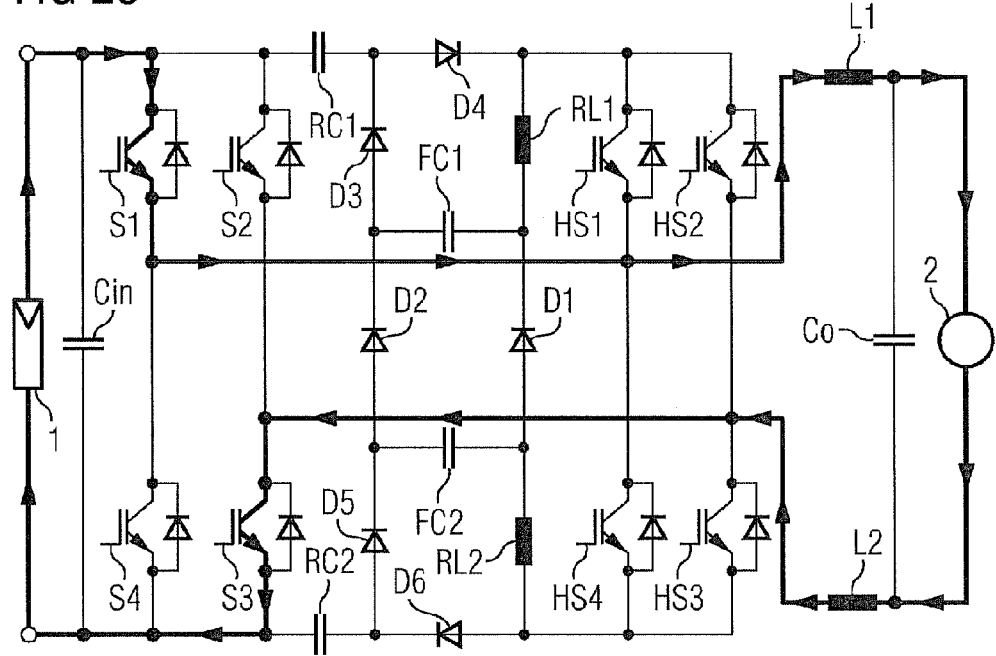
Figure 26:
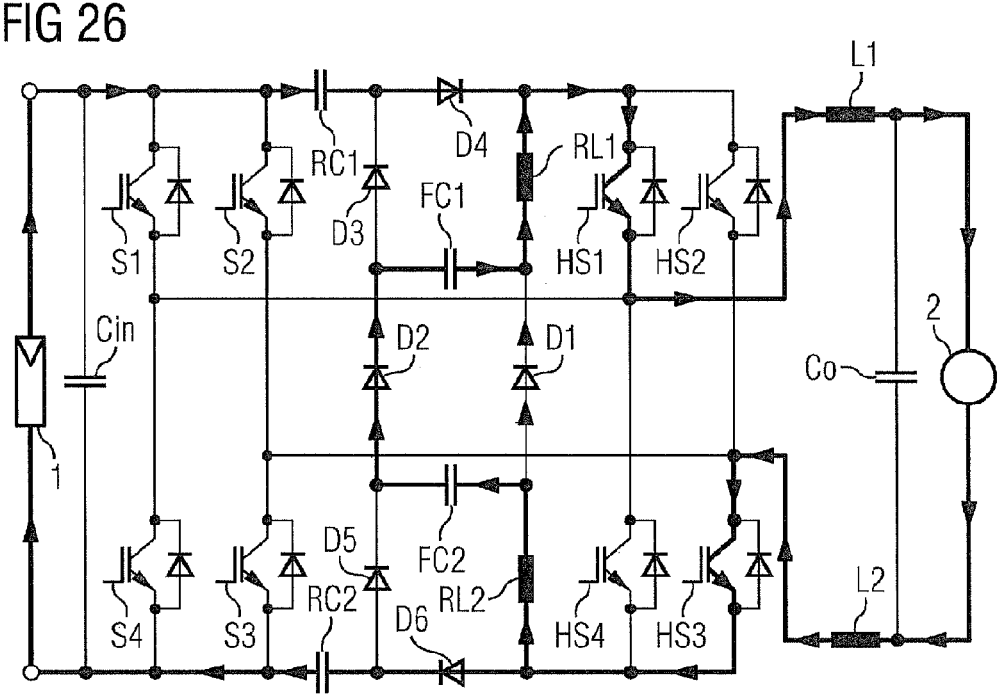

If the freewheeling diodes exhibit low switching losses and the semiconductor switches are subject to significant switching losses, as is the case with IGBTs, the concept can be simplified by disposing only two storage chokes L1, L2 instead of the above-described four storage chokes L1-L4 at the output of the inverter. The corresponding circuit is shown in FIG. 21.

In contrast to the circuit in FIG. 1, in this case the first and fourth semiconductor switches S1, S4 are interconnected in the H-bridge. Likewise the second and third semiconductor switches S2, S3 are interconnected. These connections are connected to the AC voltage outputs via respective storage chokes L1, L2. Disposed in parallel therewith is the additional H-bridge for freewheeling, with once again the first and fourth auxiliary semiconductor switches HS1, HS4 and the second and third auxiliary semiconductor switches HS2, HS3 being interconnected.

Figure 27:
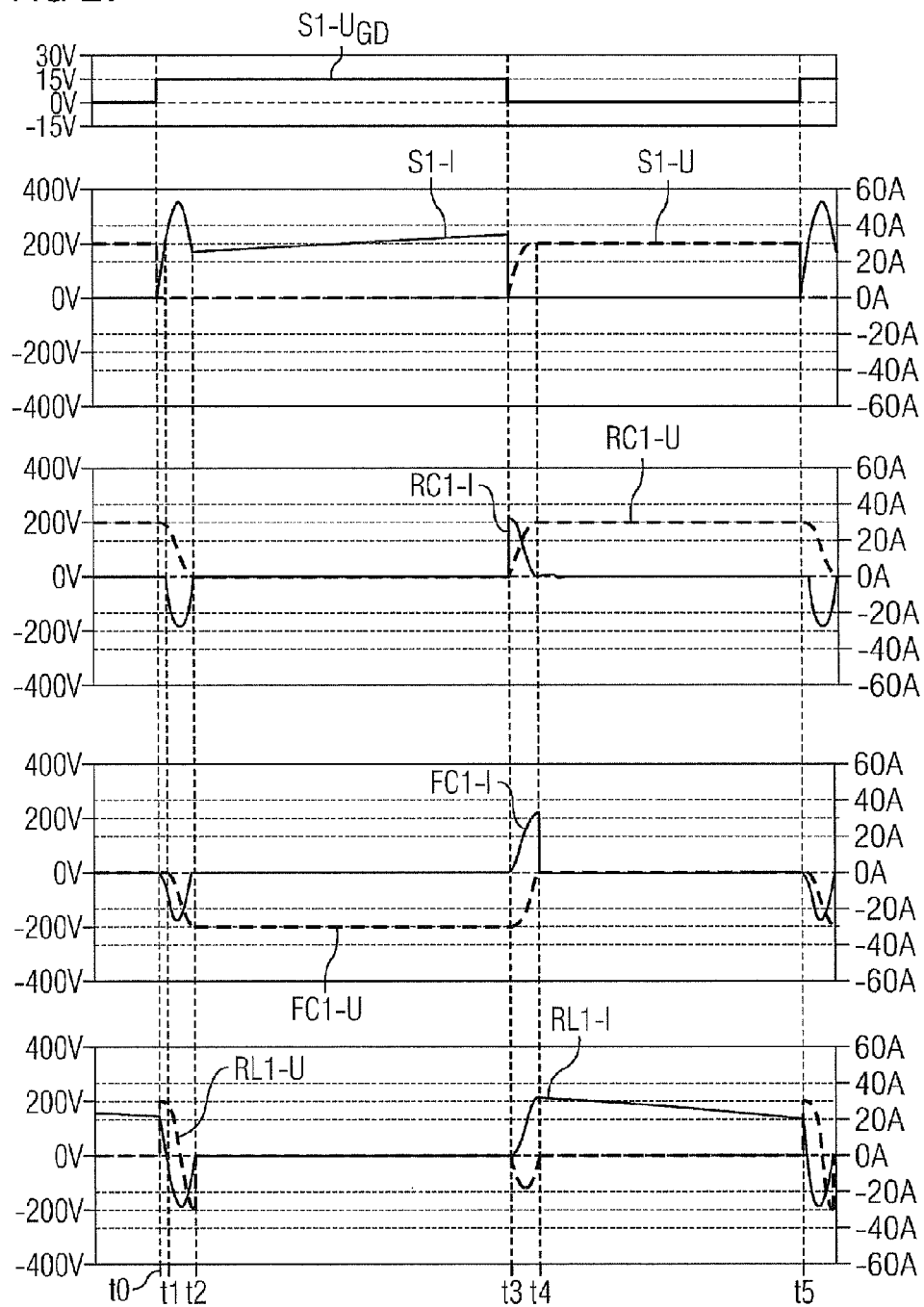
FIGS. 27-29 show current and voltage waveforms over time for a circuit according to FIG. 21
Figure 28:
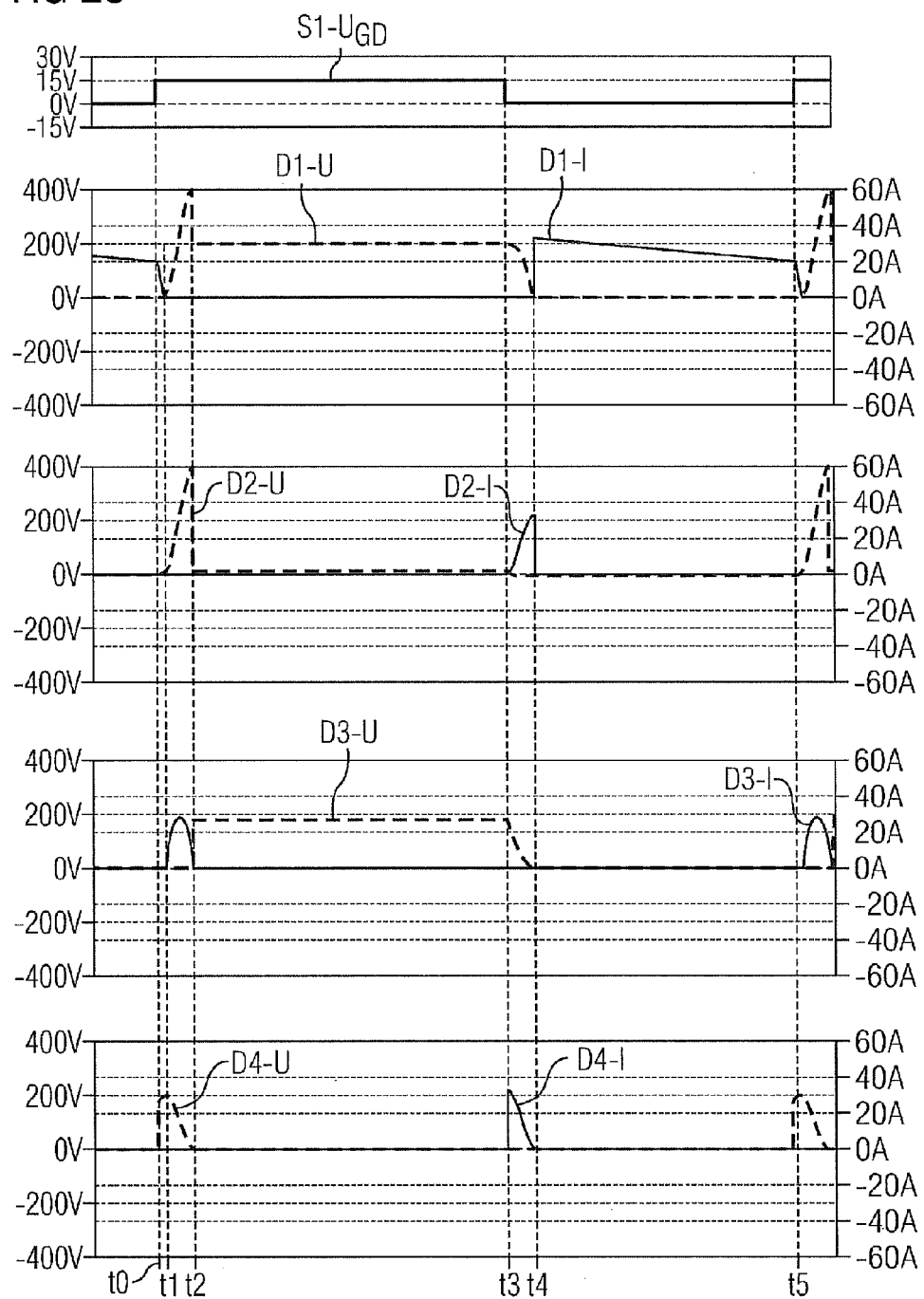
Figure 29:
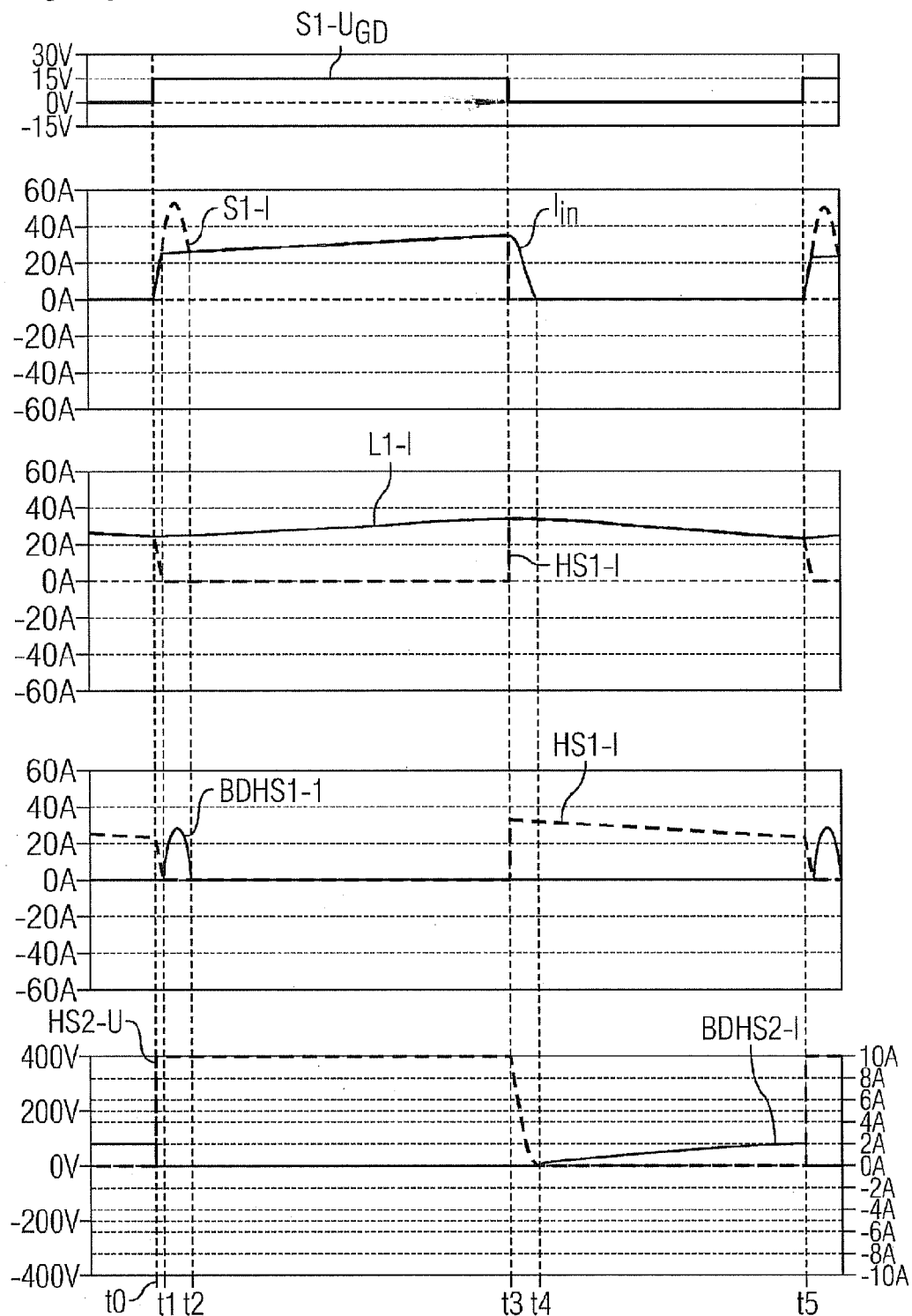

The voltage and current waveforms are shown in FIGS. 27-29, the form of representation corresponding to that in FIGS. 12-14.

The general switching conditions of such a circuit are as follows. During a positive alternation, the first and third semiconductor switches S1, S3 switch at the switching frequency, while the second and fourth semiconductor switches S2, S4 are continuously OFF. The first and third auxiliary semiconductor switches HS1, HS3 are always ON during a positive alternation, whereas the second and fourth auxiliary semiconductor switches HS2, HS4 are either OFF or switch inversely to the semiconductor switches S1, S3.

During a negative alternation, the second and fourth semiconductor switches S2, S4 are in switching mode and the first and third semiconductor switches S1, S3 remain OFF. The first and third auxiliary semiconductor switches HS1, HS3 are either OFF or switch inversely to the semiconductor switches S1, S3. The second and fourth auxiliary semiconductor switches HS2, HS4 are always ON during a negative alternation.

A sequence of defined time periods t0-t1, t1-t2, t2-t3, t3-t4 and t4-t5 during a positive alternation will now be described again with reference to circuit diagrams (FIGS. 22-26) and waveform diagrams (FIGS. 27-29). The arrangement of the resonant circuit with two resonant capacitors RC1, RC2, two resonant chokes RL1, RL2, two freewheeling capacitors RC1, RC2, a first and second freewheeling diode D1, D2, and a third, fourth, fifth and sixth diode D3, D4, D5, D6 corresponds to that shown in FIG. 1.

At the end of a freewheeling phase just before turn-on, the freewheeling current is divided between the first freewheeling diode D1 and the antiparallel or parasitic diodes of the second and fourth auxiliary semiconductor switches HS2, HS4 (FIG. 22, FIGS. 27-29).

During the first time period t0-t1 after turn-on of the first and third semiconductor switches S1, S3, current flows from the energy source 1 via these semiconductor switches S1, S3 and the two storage chokes L1, L2 into the connected system 2. As in the embodiment variants described above, the freewheeling current via the first freewheeling diode and the two resonant chokes RL1, RL2 falls to zero (FIG. 23, FIGS. 27-29).

In the same way as before, during the next time period t1-t2 the charge of the first resonant capacitor RC1 oscillates with a half period of the resonant frequency via the first semiconductor switch S1, the parasitic diode of the first auxiliary semiconductor switch HS1, the first resonant choke RL1 and the third diode D3 over to the first freewheeling capacitor FC1. Similarly, the charge of the second resonant capacitor RC2 is transferred to the second freewheeling capacitor FC2 via the fifth diode D5, the second resonant choke RL2, the parasitic diode of the third auxiliary semiconductor switch HS3 and the third semiconductor switch S3 (FIG. 24, FIGS. 27-29).

As shown in FIG. 28, the first freewheeling diode is turned off at zero voltage and the third and fifth diodes D3, D5 are turned on at zero voltage.

In the next time period t2-t3, the charge of the resonant capacitors RC1, RC2 is completely transferred to the freewheeling capacitors FC1, FC2, and the third and fifth diodes D3, D5 turn off at zero current. This prevents further oscillation of the resonant circuits RC1, FC1, RL1 and RC2, FC2, RL2 respectively. The current from the energy source 1 flows via the turned-on semiconductor switches S1, S3 and the storage chokes L2 into the system 2 (FIG. 25, FIGS. 27-29)

The start of the fourth time period t3-t4 is marked by turn-off of the first and third semiconductor switches S1, S1 The current from the energy source 1 continues to flow through the resonant capacitors RC1 and RC2 respectively, via the fourth diode D4 and the sixth diode D6 respectively and the first auxiliary semiconductor switch HS1 and the third auxiliary semiconductor switch HS3 respectively, until the resonant capacitors RC1, RC2 are charged.

The freewheeling capacitors FC1, FC2 simultaneously deliver their charge to the system via the second freewheeling diode D2, the first and third auxiliary semiconductor switches HS1, HS3 and the resonant chokes RL1, RL2 and storage chokes L1, L2 until they are fully discharged (FIG. 26, FIGS. 27-29).

At the start of the fifth time period t4-t5, the resonant capacitors are fully charged and the current from the energy source 1 falls to zero. At the same time the freewheeling capacitors are fully discharged and the freewheeling current commutates at zero voltage from the second freewheeling diode D2 to the first freewheeling diode D1 and the parallel connected parasitic or antiparallel diodes of the second and fourth auxiliary semiconductor switches HS2, HS4.

The freewheeling current now flows divided between the first freewheeling diode D1 and the parallel-connected parasitic or antiparallel diodes of the second and fourth auxiliary semiconductor switches HS2, HS4 until the next turn-on process takes place (FIG. 22, FIGS. 27-29).

The same sequence occurs during a negative alternation, with in this case the second and fourth semiconductor switches S2, S4 switching and the second and fourth auxiliary semiconductor switches HS2, HS4 being ON.

Another embodiment variant of the present invention relates to an inverter having a power transformer for electrically isolating the energy source 1 connected on the input side and the AC voltage system 2 connected on the output side.

Figure 30:
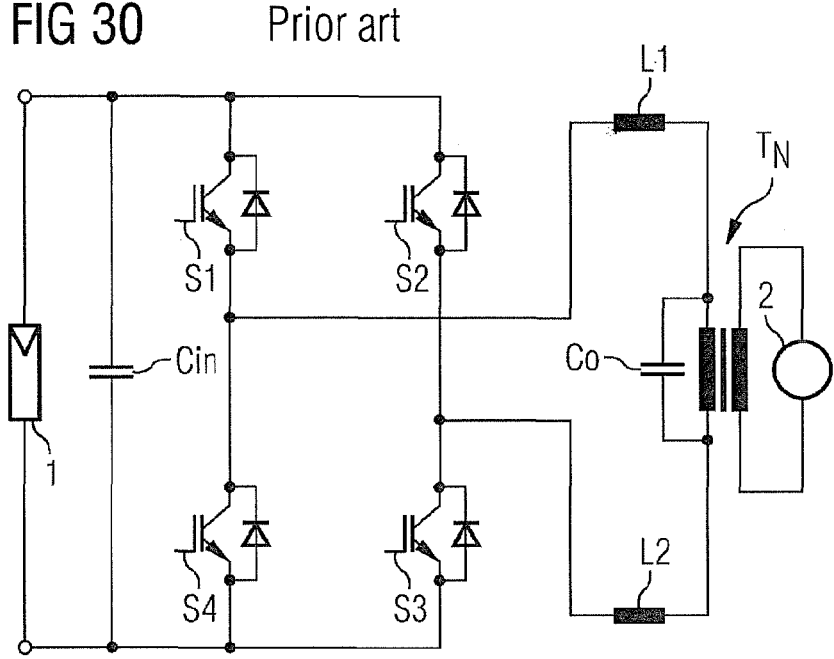
FIG. 30 shows an H-bridge circuit with power transformer

An H-bridge having four semiconductor switches S1, S2, S3, S4 is connected on the input side in the known manner to the energy source 1 and, on the output side, via two storage chokes L1, L2 to a primary winding of a power transformer $T_N$. An input capacitor Cin may be disposed on the input side, and an output capacitor Co may be connected in parallel with the primary winding. Connection to the system 2 is via a secondary winding of the power transformer $T_N$ (FIG. 30).

In an embodiment variant of this kind, the semiconductor switches operating at the switching frequency are connected asymmetrically. Thus, during a positive alternation the second and fourth semiconductor switches S2, S4 are always OFF, the third semiconductor switch S3 is always ON and the first semiconductor switch S1 is in switching mode.

The resulting unilateral jump of the intermediate circuit is negligible due to the electrical isolation provided by the transformer. In the case of transformerless inverters, on the other hand, the H-bridge must always be switched symmetrically, since otherwise voltage jumps of the energy source 1 to ground would occur at the switching frequency. This is particularly to be avoided in the case of solar generators in order not to shorten the service life of the solar generator insulation or cause massive EMC problems. In addition, it would result in significant switching losses, caused by transfer of the solar generator to ground capacitance.

After the switching semiconductor switch S1 has turned off, the freewheeling current flows via the antiparallel or parasitic diode of the fourth semiconductor switch S4 and via the turned-on third semiconductor switch S3.

During a negative alternation, the second semiconductor switch S2 is in switching mode, the fourth semiconductor switch S4 remains continuously ON and the first and third semiconductor switches S1, S3 remain continuously OFF. The freewheeling current flows in this case via the antiparallel or parasitic diode of the third semiconductor switch S3 and via the turned-on fourth semiconductor switch S4.

Alternatively, during both alternations, the continuously ON semiconductor switches S3 or S4 and the switching semiconductor switches S1 or S2 can be interchangeably controlled. Accordingly, during a positive alternation the third semiconductor switch S3 can also be in switching mode and the first semiconductor switch S1 continuously ON. During a negative alternation, the fourth semiconductor switch S4 can be in switching mode and the second semiconductor switch S2 in the ON state.

Figure 31:
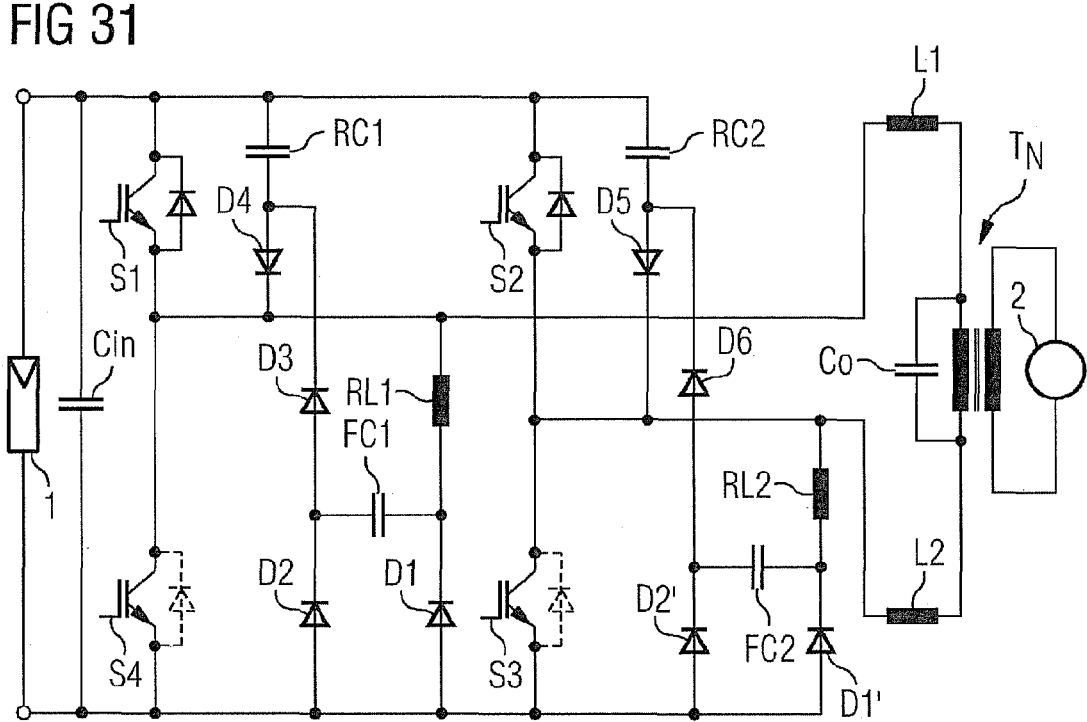
FIG. 31 shows an H-bridge circuit with power transformer and resonant circuit

FIG. 31 shows the implementation of the resonant circuit for an inverter with power transformer.

For the first semiconductor switch S1, a first freewheeling diode D1, a third and fourth diode D3, D4, a first freewheeling capacitor FC1, a first resonant capacitor RC1 and a first freewheeling choke RL1 constitute a first resonant circuit, said first freewheeling diode D1 in this case replacing the antiparallel or parasitic diode of the fourth semiconductor switch S4 in FIG. 30.

The first freewheeling diode D1 is connected by its anode to the bridge connection between the third and fourth semiconductor switches S3, S4. The cathode is connected via the first resonant choke RL1 to the bridge connection of the first and fourth semiconductor switches S1, S4. Connected in parallel with the first freewheeling diode D1 is a second freewheeling diode D2 in series with the first freewheeling capacitor FC1. The bridge connection of the first and second semiconductor switches S1, S2 is connected via the first resonant capacitor RC1 to the anode of the fourth diode D4 whose cathode is connected to the bridge connection of the first and fourth semiconductor switches S1, S4. A connection point between first resonant capacitor RC1 and fourth diode D4 is connected to the cathode of the third diode D3 whose anode is connected to a connection point between second freewheeling diode D2 and first freewheeling capacitor FC1.

For the second semiconductor switch S2, an additional first freewheeling diode D1', a fifth and sixth diode D5, D6, a second freewheeling capacitor FC2, a second resonant capacitor RC2, and a second resonant choke RL2 constitute a resonant circuit. Said resonant circuit is disposed in the manner described above between the bridge connection of the second and third semiconductor switches S2, S3 and the bridge connection of the third and fourth semiconductor switches S3, S4, an additional second freewheeling diode D2' in series with the second freewheeling capacitor FC2 being provided in parallel with the additional first freewheeling diode D1'.

FIGS. 32-36 show the current flows of the resonant switching behavior during a positive alternation in the time periods t0-t1, t1-t2, t2-t3, t3-t4 and t4-t5 defined above.

Figure 32:
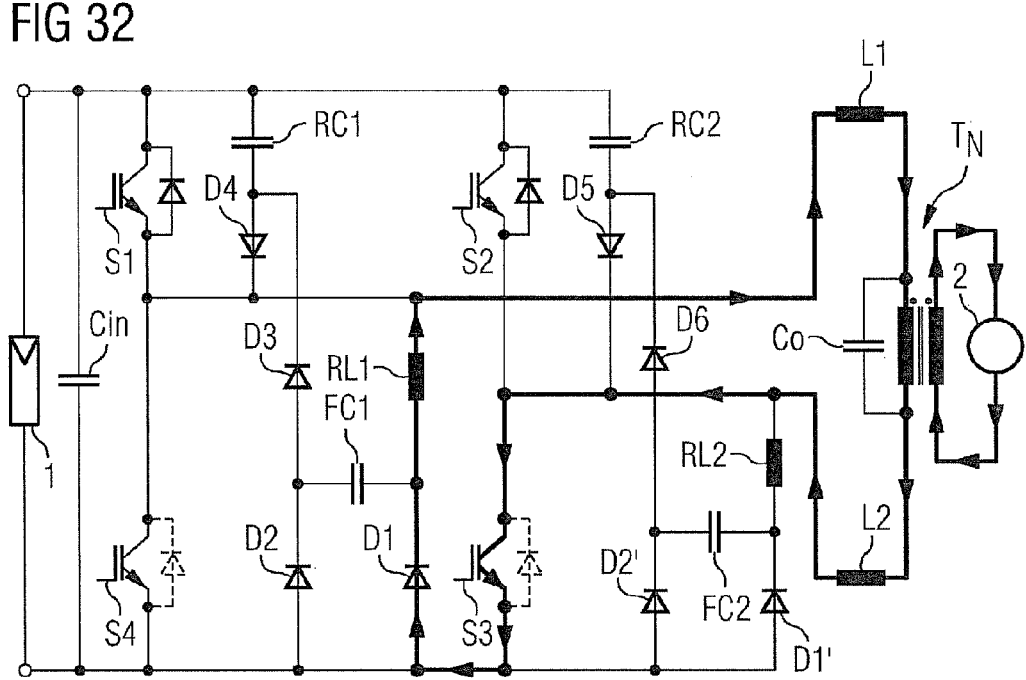
FIGS. 32-36 show the circuit according to FIG. 31 with current flows during a switching cycle for a positive alternation
Figure 33:
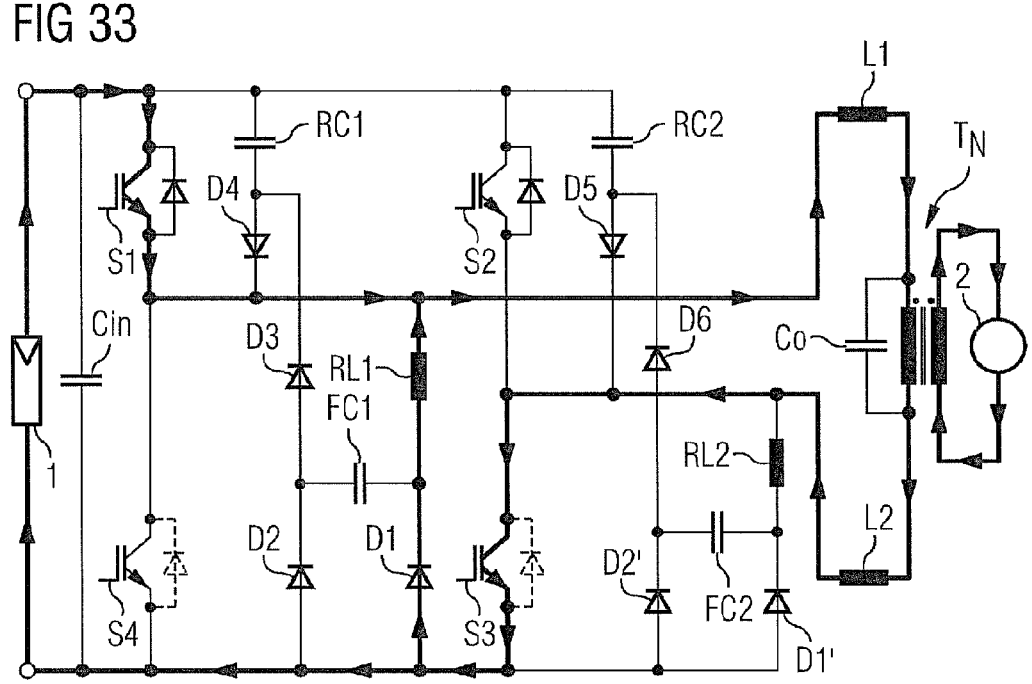
Figure 34:
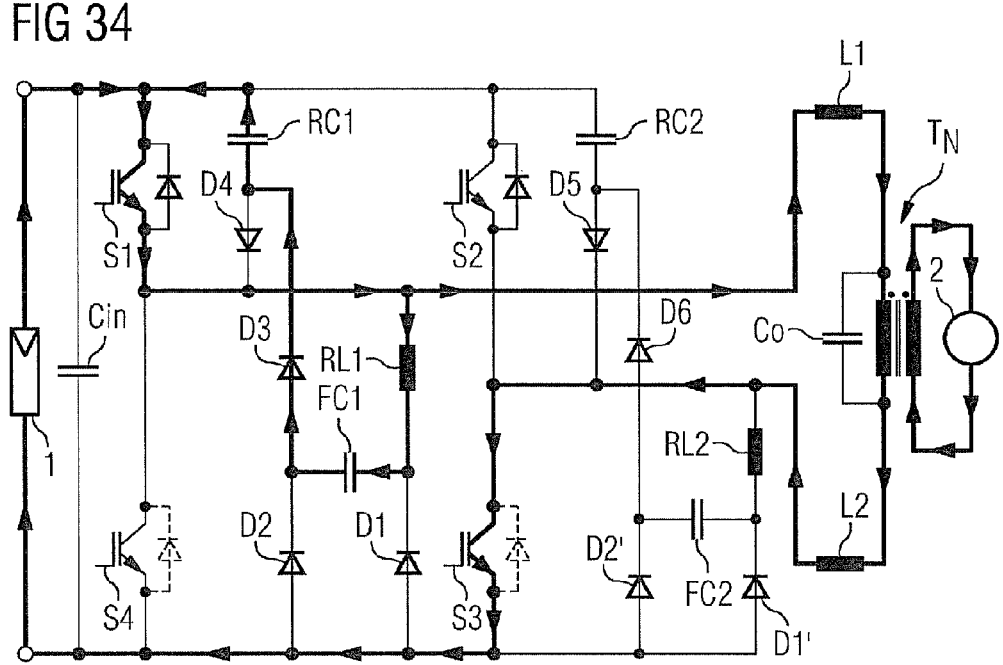
Figure 35:
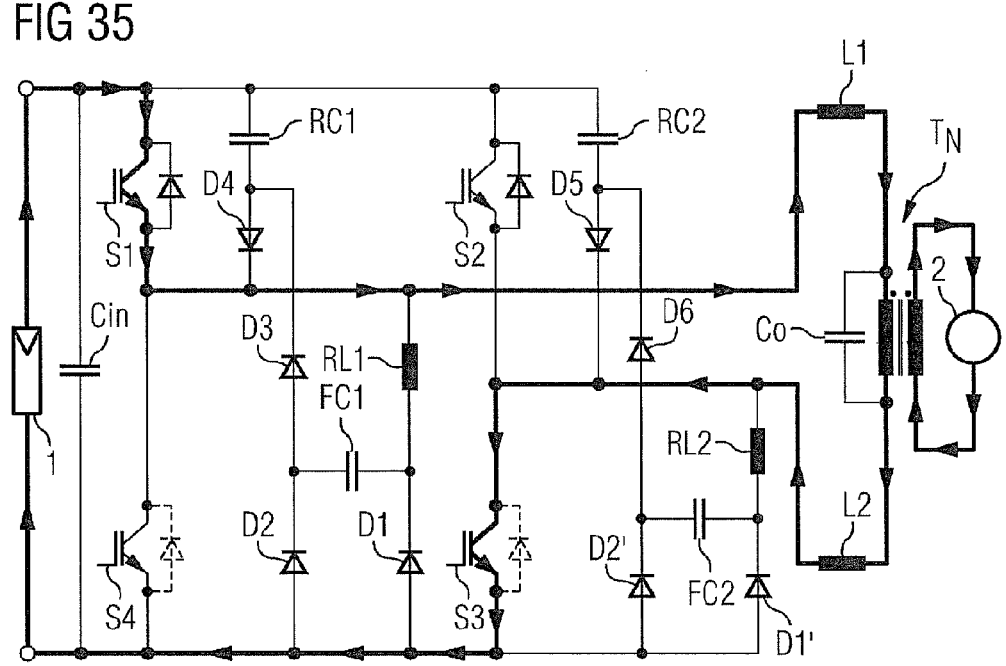
Figure 36:
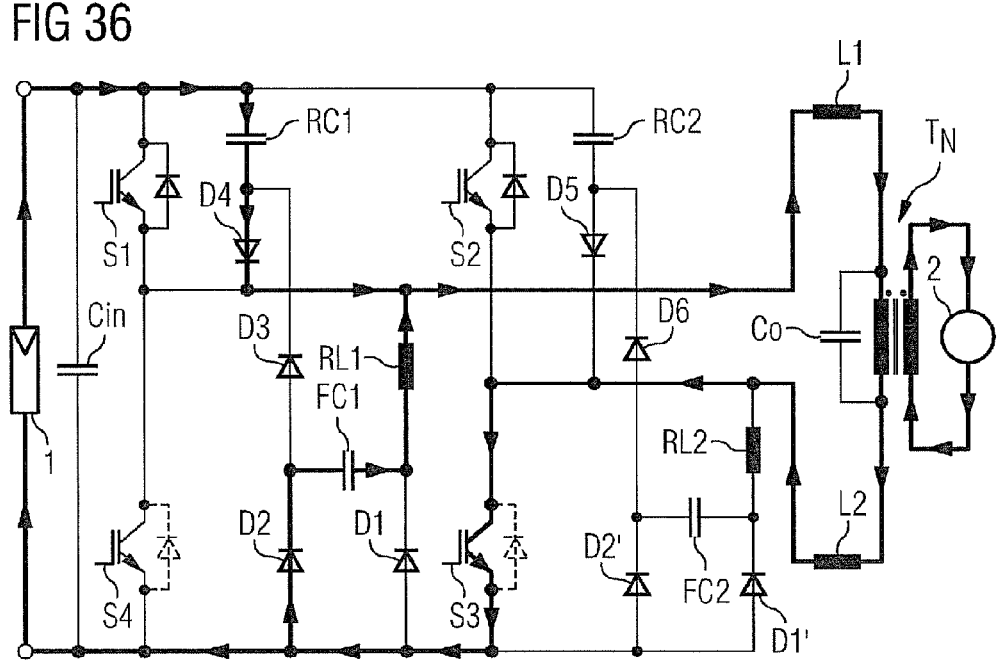
Figure 37:
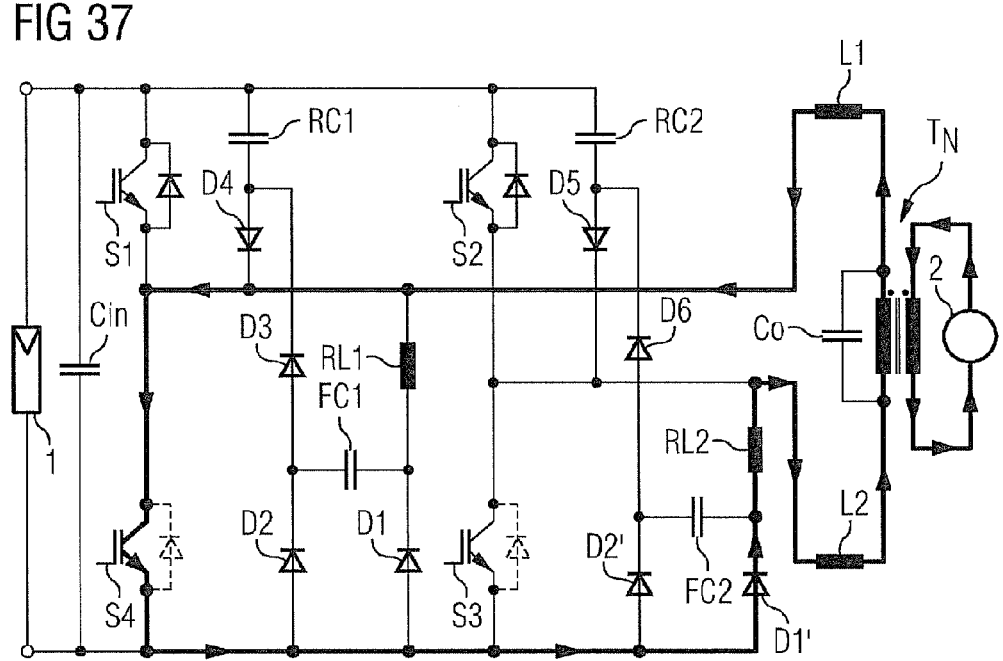
FIGS. 37-41 shows the circuit according to FIG. 31 with current flows during a switching cycle for a negative alternation
Figure 38:
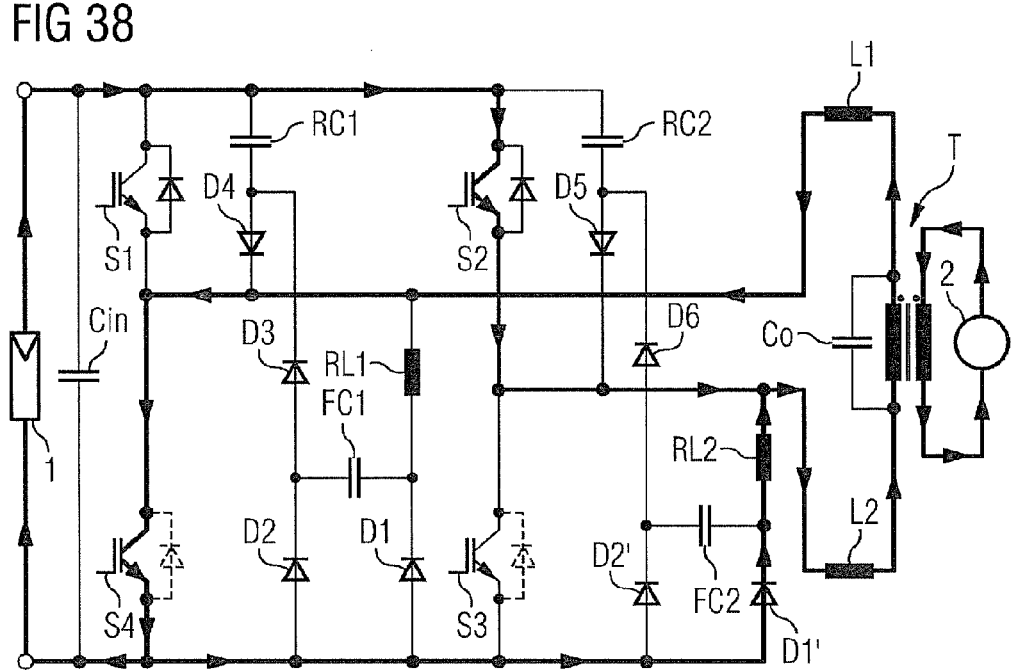
Figure 39:
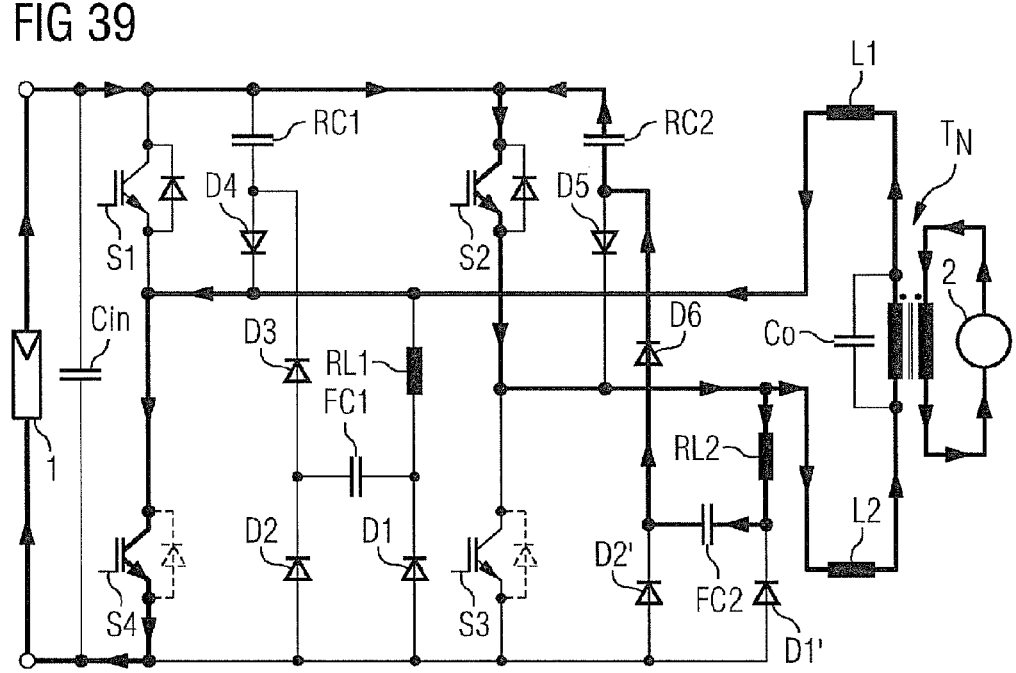
Figure 40:
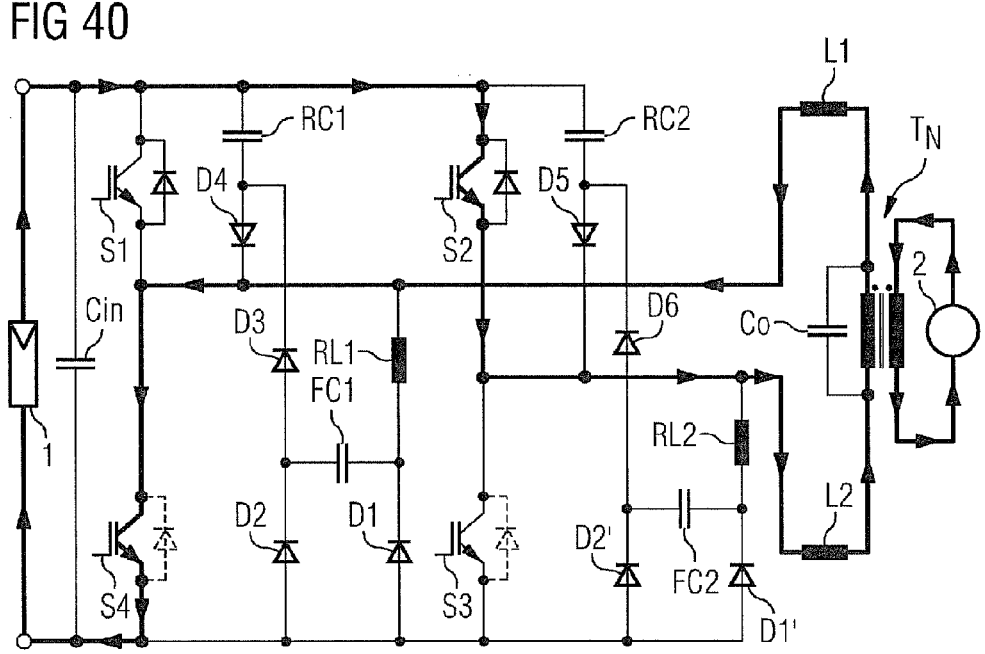
Figure 41:
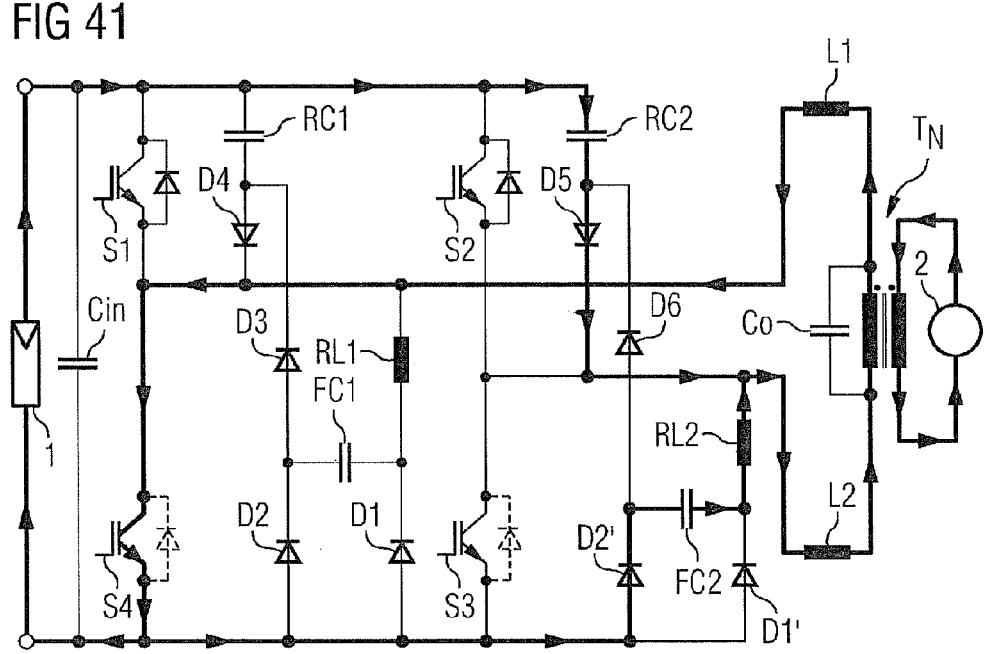

Shortly before turn-on of the first semiconductor switch S1, the freewheeling current flows in the storage chokes L1, L2 through the first freewheeling diode D1, via the third semiconductor switch S3, the first resonant choke RL1 and via the power transformer $T_N$ (FIG. 32).

The first time period t0-t1 (FIG. 33) begins with turn-on of the first semiconductor switch S1. The current from the energy source 1 flows through the first semiconductor switch S1, through the storage chokes L1, L2 and the primary winding of the power transformer $T_N$ and via the third semiconductor switch S3. Additionally connected in this case is the first resonant circuit RC1, RL1, FC1 which begins to oscillate at the following resonant frequency $\omega_0$:

$$\omega_0^2=1/(((RC1*FC1)/(RC1+FC1))*RL1)$$

As a result, the freewheeling current in the first freewheeling diode D1 falls to zero via the first resonant choke RL1.

In the subsequent time period t1-t2 (FIG. 34), the charge of the first resonant capacitor RC1 oscillates with half the period of the resonant frequency over to the first freewheeling capacitor FC1, the current in this case flowing through the first semiconductor switch S1, the first resonant choke RL1 and via the third diode D3.

At the start of the third time period t2-t3 (FIG. 35), the charge of the first resonant capacitor RC1 has been completely transferred to the first freewheeling capacitor FC1 and the third diode D3 turns off with zero current, thereby preventing further oscillation in the resonant circuit RC1, FC1, RL1. The current from the energy source 1 continues to flow through the first and third semiconductor switches S1, S3, the storage chokes L1, L2 and the primary winding of the power transformer $T_N$.

The fourth time period t3-t4 (FIG. 36) begins with turn-off of the first semiconductor switch S1. The third semiconductor switch S3 remains ON, which means that current continues to flow from the energy source 1 through the first resonant capacitor RC1, the fourth diode D4, via the storage chokes L1, L2 and the power transformer $T_N$ until the first resonant capacitor RC1 is charged.

The first freewheeling capacitor FC1 simultaneously delivers its charge to the system 2 via the first resonant choke RL1, the storage chokes L1, L2, the power transformer $T_N$, the third semiconductor switch S3 and the second freewheeling diode D2 until the first freewheeling capacitor FC1 is fully discharged.

At the start of the last time period t4-t5 (FIG. 32), the first resonant capacitor RC1 is fully charged and the current from the energy source 1 falls to zero. At the same time the first freewheeling capacitor FC1 is fully discharged and the freewheeling current commutates at zero voltage from the second freewheeling diode D2 to the first freewheeling diode D1. The freewheeling current of the storage chokes L1, L2 then flows through the first freewheeling diode D1, via the third semiconductor switch S3, the first resonant choke RL1 and the primary winding of the power transformer $T_N$ until the first semiconductor switch S1 is turned on again.

FIGS. 37-41 show a corresponding sequence for a switching cycle during a negative alternation. Shortly before the turn-on instant t0, the freewheeling current of the storage chokes L1, L2 flows through the primary winding, the fourth semiconductor switch S4, the additional first freewheeling diode D1' and the second resonant choke RL2.

At the start of the first time period t0-t1 (FIG. 38), the second semiconductor switch S2 is turned on and the current from the energy source 1 flows via it through the storage chokes L1, L2, the primary winding and via the continuously ON fourth semiconductor switch S4. A second resonant circuit RC2, RL2, FC2 is additionally connected which begins to oscillate at the following resonant frequency:

$$\omega_0^2=1/(((RC2*FC2)/(RC2+FC2))*RL2)$$

This causes the freewheeling current in the additional first freewheeling diode D1' to fall to zero via the second resonant choke RL2.

In the subsequent second time period t1-t2 (FIG. 39), the charge of the second resonant capacitor RC2 oscillates over to the second freewheeling capacitor FC2 at half the period of the resonant frequency, with the current flowing via the sixth diode D6, the second semiconductor switch S2 and the second resonant choke RL2.

At the start of the third time period t2-t3 (FIG. 40), the charge of the second resonant capacitor RC2 has been completely transferred to the second freewheeling capacitor FC2. The sixth diode D6 turns off at zero current and prevents further oscillation of the resonant circuit RC2, RL2, FC2. The current from the energy source 1 continues to flow via the second and fourth semiconductor switches S2, S4, the storage chokes L1, L2 and the primary winding.

The fourth time period t3-t4 (FIG. 41) begins with turn-off of the second semiconductor switch S2. The fourth semiconductor switch S4 remains ON and the current from the energy source 1 continues to flow via it through the second resonant capacitor RC2, via the fifth diode D5, the storage chokes L1, L2 and the primary winding until the second resonant capacitor RC2 is charged.

The second freewheeling capacitor FC2 simultaneously delivers its charge via the second resonant choke RL2, the power transformer $T_N$, the storage chokes L1, L2, the fourth semiconductor switch S4 and the additional second freewheeling diode D2' to the system 2 until the second freewheeling capacitor FC2 is fully discharged.

At the start of the fifth time period t4-t5 (FIG. 37), the second resonant capacitor RC2 is fully charged and the current from the energy source 1 falls to zero. At the same time the second freewheeling capacitor FC2 is fully discharged and the freewheeling current commutates at zero voltage from the additional second freewheeling diode D2' to the additional first freewheeling diode D1'. The freewheeling current of the two storage chokes L1, L2 then flows via the primary winding, the fourth semiconductor switch S4, the additional first freewheeling diode D1' and the second resonant choke RL2.

The elements of the resonant circuits described must be dimensioned such that the corresponding resonant frequency is higher than the predefined switching frequency. The duration of a half period of the resonant frequency shall be shorter than the shortest possible ON time of the switching semiconductor switch or switches predetermined by a controller.

The invention claimed is:

1. An inverter for converting a DC input voltage to an AC output voltage, comprising:
   an H-bridge with four semiconductor switches, wherein least one semiconductor switch is in switching mode,
   a storage choke circuit disposed between the H-bridge and output-side AC voltage terminals, the storage choke circuit comprising a freewheeling path with a freewheeling diode for commutating the current after a turn-off process of semiconductor switch of the H-bridge, wherein:
   for zero voltage switching, each switching semiconductor switch is coupled to a resonant circuit comprising capacitive resonant elements and inductive resonant elements,
   the freewheeling path comprises a first and a second freewheeling diode connected in parallel forming a parallel circuit,
   the parallel circuit is connected in series with the inductive resonant elements,
   the second freewheeling diode is connected in series with capacitive freewheeling elements which are charged to a corresponding voltage at a start of a freewheeling phase as elements of the resonant circuit for zero voltage switching of the second freewheeling diode, wherein:
a first semiconductor switch of the H-bridge is connected via a first storage choke and a third semiconductor switch of the H-bridge is connected via a second storage choke to a first AC voltage terminal,
a second semiconductor switch of the H-bridge is connected via a third storage choke and a fourth semiconductor switch of the H-bridge is connected via a fourth storage choke to a second AC voltage terminal,
the freewheeling path additionally comprises an additional H-bridge having four auxiliary semiconductor switches,
a first auxiliary semiconductor switch of the additional H-bridge is connected via the first storage choke and the third auxiliary semiconductor switch of the additional H-bridge is connected via the second storage choke to the first AC voltage terminal, and
a second auxiliary semiconductor switch of the additional H-bridge is connected via the third storage choke and the fourth auxiliary semiconductor switch of the additional H-bridge is connected via the fourth storage choke to the second AC voltage terminal.

2. The inverter as claimed in claim 1, wherein:
each resonant circuit comprises a resonant capacitor and a resonant choke,
a freewheeling capacitor is connected to a resonant capacitor via coupling elements,
a first leg of the freewheeling path comprises the first freewheeling diode and the resonant choke connected in series, and
a second leg of the freewheeling path comprises the second freewheeling diode, the resonant choke and the freewheeling capacitor connected in series.

3. The inverter as claimed in claim 1, wherein:
the connection of the third and fourth auxiliary semiconductor switches and the connection of the first and second auxiliary semiconductor switches are connected via a series circuit comprising the first freewheeling diode and a resonant choke,
a series circuit comprising a second freewheeling diode and a freewheeling capacitor is disposed in parallel with the first freewheeling diode,
a connection point between second freewheeling diode and freewheeling capacitor is additionally connected to the connection of the first and second auxiliary semiconductor switches via a series circuit comprising a third diode and a fourth diode,
a secondary winding of a transformer which additionally comprises two primary windings, the secondary winding being disposed in parallel with the third diode,
the first primary winding being connected at one end to the connection of the first and second semiconductor switches of the H-bridge and at the other end via a first resonant capacitor to the connection between first semiconductor switch and first storage choke and via a second resonant capacitor to the connection between second semiconductor switch and third storage choke, and
the second primary winding being connected at one end to the connection of the third and fourth semiconductor switches of the H-bridge and at the other end via a third resonant capacitor to the connection between third semiconductor switch and second storage choke and via a fourth resonant capacitor to the connection between fourth semiconductor switch and fourth storage choke.

4. The inverter as claimed in claim 1, wherein:
the connection of the third and fourth auxiliary semiconductor switches and the connection of the first and second auxiliary semiconductor switches are connected via a series circuit comprising a second resonant choke, the first freewheeling diode and a first resonant choke,
a series circuit comprising a second freewheeling capacitor, the second freewheeling diode and a first freewheeling capacitor is disposed in parallel with the first freewheeling diode,
a connection point between second freewheeling diode and first freewheeling capacitor is additionally connected via a series circuit comprising a third diode and a fourth diode to the connection of the first and second auxiliary semiconductor switches,
the connection of the third and fourth auxiliary semiconductor switches is connected via a sixth diode and a fifth diode to a connection point between second freewheeling diode and second freewheeling capacitor,
a connection point between third and fourth diode is connected via a first resonant capacitor to the connection of the first semiconductor switch and second semiconductor switch, and
a connection point between fifth and sixth diode is connected via a second resonant capacitor to the connection of the third semiconductor switch and fourth semiconductor switch.

5. The inverter as claimed in claim 1, wherein DC voltage terminals are interconnected via an input capacitor.

6. The inverter as claimed in claim 1, wherein the AC voltage terminals are interconnected via an output capacitor.

7. An inverter for converting a DC input voltage to an AC output voltage, comprising:
an H-bridge with four semiconductor switches, wherein at least one semiconductor switch is in switching mode,
a storage choke circuit disposed between the H-bridge and output-side AC voltage terminals, the storage choke circuit comprising a freewheeling path with a freewheeling diode for commutating the current after a turn-off process of a semiconductor switch of the H-bridge, wherein:
for zero voltage switching, each switching semiconductor switch is coupled to a resonant circuit comprising capacitive resonant elements and inductive resonant elements,
the freewheeling path comprises a first and a second freewheeling diode connected in parallel forming a parallel circuit,
the parallel circuit is connected in series with the inductive resonant elements, and
the second freewheeling diode is connected in series with capacitive freewheeling elements which are charged to a corresponding voltage at a start of a freewheeling phase as elements of the resonant circuit for zero voltage switching of the second freewheeling diode,
wherein:
one half of the H-bridge is connected via a first storage choke to a first AC voltage terminal and the other half of the H-bridge is connected via a second storage choke to a second AC voltage terminal, and
the freewheeling path additionally comprises an additional H-bridge having four auxiliary semiconductor switches,
one half of the additional H-bridge being connected via the first storage choke to the first AC voltage terminal and the other half of the additional H-bridge being connected via the second storage choke to the second AC voltage terminal.

8. The inverter as claimed in claim 7, wherein:
the connection of the third and fourth auxiliary semiconductor switches and the connection of the first and second auxiliary semiconductor switches are connected via a series circuit comprising a second resonant choke, the first freewheeling diode and a first resonant choke,
a series circuit comprising a second freewheeling capacitor, the second freewheeling diode and a first freewheeling capacitor is disposed in parallel with the first freewheeling diode,
a connection point between second freewheeling diode and first freewheeling capacitor is additionally connected via a series circuit comprising a third diode and a fourth diode to the connection of the first and second auxiliary semiconductor switches,
the connection of the third and fourth auxiliary semiconductor switches is connected via a sixth diode and a fifth diode to a connection point between second freewheeling diode and second freewheeling capacitor,
a connection point between third and fourth diode is connected via a first resonant capacitor to the connection of the first semiconductor switch and second semiconductor switch, and
a connection point between fifth and sixth diode is connected via a second resonant capacitor to the connection of the third semiconductor switch and fourth semiconductor switch.

9. The inverter as claimed in claim 7, wherein DC voltage terminals are interconnected via an input capacitor.

10. The inverter as claimed in claim 7, wherein the AC voltage terminals are interconnected via an output capacitor.

11. An inverter for converting a DC input voltage to an AC output voltage, comprising:
an H-bridge with four semiconductor switches, wherein at least one semiconductor switch is in switching mode,
a storage choke circuit disposed between the H-bridge and output-side AC voltage terminals, the storage choke circuit comprising a freewheeling path with a freewheeling diode for commutating the current after a turn-off process of a semiconductor switch of the H-bridge, wherein:
for zero voltage switching, each switching semiconductor switch is coupled to a resonant circuit comprising capacitive resonant elements and inductive resonant elements,
the freewheeling path comprises a first and a second freewheeling diode connected in parallel forming a parallel circuit,
the parallel circuit is connected in series with the inductive resonant elements, and
the second freewheeling diode is connected in series with capacitive freewheeling elements which are charged to a corresponding voltage at a start of a freewheeling phase as elements of the resonant circuit for zero voltage switching of the second freewheeling diode,
wherein:
a first H-bridge terminal between a first semiconductor switch and a fourth semiconductor switch is connected via a first storage choke to a first AC voltage terminal,
a second H-bridge terminal between a second semiconductor switch and a third semiconductor switch is connected via a second storage choke to a second AC voltage terminal,
the AC voltage terminals are interconnected via a primary winding of a power transformer,
the connection of the third and fourth semiconductor switches is additionally connected via a series circuit comprising a first freewheeling diode and first resonant choke to the first H-bridge terminal,
a series circuit comprising a second freewheeling diode and first freewheeling capacitor is disposed in parallel with the first freewheeling diode,
a series circuit comprising a first resonant capacitor and a fourth diode is disposed in parallel with the first semiconductor switch,
a connection point between second freewheeling diode and first freewheeling capacitor is connected via a third diode to a connection point between first resonant capacitor and fourth diode,
the connection of the third and fourth semiconductor switches is additionally connected via a series circuit comprising an additional first freewheeling diode and second resonant choke to the second H-bridge terminal,
a series circuit comprising an additional second freewheeling diode and a second freewheeling capacitor is disposed in parallel with the additional first freewheeling diode,
a series circuit comprising a second resonant capacitor and a fifth diode is disposed in parallel with the second semiconductor switch, and
a connection point between additional second freewheeling diode and second freewheeling capacitor is connected via a sixth diode to a connection point between second resonant capacitor and fifth diode.

12. The inverter as claimed in claim 11, wherein DC voltage terminals are interconnected via an input capacitor.

13. The inverter as claimed in claim 11, wherein the AC voltage terminals are interconnected via an output capacitor.

* * * * *